US011916716B2

(12) United States Patent
Ly et al.

(10) Patent No.: US 11,916,716 B2
(45) Date of Patent: Feb. 27, 2024

(54) DYNAMIC PEAK REDUCTION TONE ALLOCATION WITH LOW OVERHEAD

(71) Applicant: QUALCOMM Incorporated, San Diego, CA (US)

(72) Inventors: Hung Dinh Ly, San Diego, CA (US); Saeid Sahraei, San Diego, CA (US); Gokul Sridharan, Sunnyvale, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 404 days.

(21) Appl. No.: 17/383,201

(22) Filed: Jul. 22, 2021

(65) Prior Publication Data
US 2022/0052895 A1    Feb. 17, 2022

Related U.S. Application Data

(60) Provisional application No. 63/066,773, filed on Aug. 17, 2020.

(51) Int. Cl.
*H04L 27/26*    (2006.01)
*H04W 52/54*    (2009.01)
(Continued)

(52) U.S. Cl.
CPC ........ *H04L 27/2618* (2013.01); *H04L 5/0092* (2013.01); *H04W 52/247* (2013.01);
(Continued)

(58) Field of Classification Search
CPC . H04L 27/2618; H04L 5/0042; H04L 5/0092; H04W 52/54; H04W 72/0453; H04W 72/23; H04W 52/247; H04W 52/52
See application file for complete search history.

(56) References Cited

U.S. PATENT DOCUMENTS

| 11,716,233 B2 * | 8/2023 | Sahraei | ................. H04L 1/0071 370/336 |
| 2009/0141823 A1 * | 6/2009 | Long | ................... H04L 27/2618 375/260 |

(Continued)

FOREIGN PATENT DOCUMENTS

EP        1838062 A1 *    9/2007    ......... H04L 27/2614

OTHER PUBLICATIONS

Yu P., et al., "A Low Complexity Tone Reservation Scheme Based on Time-Domain Kernel Matrix for PAPR Reduction in OFDM Systems", IEEE Transactions on Broadcasting, vol. 61, No. 4, Dec. 2015, pp. 710-716.

*Primary Examiner* — Mounir Moutaouakil
(74) *Attorney, Agent, or Firm* — Shumaker & Sieffert, P.A.

(57) ABSTRACT

Aspects of the disclosure relate to techniques for peak-to-average power ratio (PAPR) reduction based on a tone reservation (TR) algorithm. For a TR algorithm, a suitable subset of tones from among a full set of tones in a given resource allocation are reserved for use as peak reduction tones (PRT). An apparatus such as a transmission/reception point receives a set of one or more PRT sequences and stores them in memory. The transmission/reception point then determines a set of PRTs based on one or more later-received PRT sequence selection parameters. Other aspects, embodiments, and features are also claimed and described.

16 Claims, 10 Drawing Sheets

(51) Int. Cl.
*H04W 72/0453* (2023.01)
*H04W 72/23* (2023.01)
*H04L 5/00* (2006.01)
*H04W 52/52* (2009.01)
*H04W 52/24* (2009.01)

(52) U.S. Cl.
CPC ........... *H04W 52/52* (2013.01); *H04W 52/54* (2013.01); *H04W 72/0453* (2013.01); *H04W 72/23* (2023.01)

(56) References Cited

U.S. PATENT DOCUMENTS

| | | | |
|---|---|---|---|
| 2022/0014409 A1* | 1/2022 | Sahraei | H04L 27/2621 |
| 2022/0038322 A1* | 2/2022 | Ly | H04L 27/2614 |
| 2022/0039027 A1* | 2/2022 | Mukkavilli | H04L 27/2618 |
| 2022/0039093 A1* | 2/2022 | Ly | H04L 27/2618 |

* cited by examiner

Example PRT placement within a set of tones

DYNAMIC PEAK REDUCTION TONE ALLOCATION WITH LOW OVERHEAD

PRIORITY CLAIM

This application claims priority to and the benefit of Provisional Patent Application No. 63/066,773, filed in the U.S. Patent and Trademark Office (USPTO) on Aug. 17, 2020, the entire content of which is incorporated herein by reference as if fully set forth below in its entirety and for all applicable purposes.

TECHNICAL FIELD

The technology discussed below relates generally to wireless communication systems, and more particularly, to peak-to-average power reduction in a wireless transmission. Embodiments can provide and enable techniques for a dynamic, flexible selection of peak reduction tones (PRTs) in a tone reservation (TR) algorithm for reducing a peak-to-average power ratio (PAPR) in a wireless transmission.

INTRODUCTION

Contemporary wireless communication systems frequently employ orthogonal frequency division multiplexing (OFDM) for transmitting information over a set of closely-spaced frequency subcarriers or tones. While OFDM provides many advantages over other transmission waveforms, it can sometimes suffer from a high peak-to-average power ratio (PAPR). With many currently available radios used in wireless devices, reduction of the PAPR can improve transmission performance by enabling a higher average transmission power without distorting the waveform when its peaks exceed a saturation point of a power amplifier.

As the demand for mobile broadband access continues to increase, research and development continue to advance wireless communication technologies not only to meet the growing demand for mobile broadband access, but to advance and enhance the user experience with mobile communications.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In some aspects, the present disclosure provides a process for a wireless communication device to determine a set of tones for use as peak reduction tones (PRTs) in a tone reservation (TR) algorithm for a peak-to-average power ratio (PAPR) reduction technique.

Some aspects of the disclosure provide a transmitter, a method of wireless communication operable at a transmitter, a wireless communication apparatus, and a computer-readable medium storing code for a wireless communication apparatus, for PRT sequence determination. A transmitter may receive control information that includes a set of one or more peak reduction tone (PRT) sequences, a resource allocation spanning a set of multiple tones, and a PRT sequence selection parameter for determining a set of the multiple tones of the resource allocation to be PRTs, based on the set of one or more PRT sequences. The transmitter may then transmit a sum of a data waveform and a peak-to-average-power (PAPR)-reduction waveform. The data waveform may be carried on resources corresponding to the resource allocation. The PAPR-reduction waveform may be carried on the PRTs to reduce an amplitude of a peak in the data waveform.

Further aspects of the disclosure provide a receiver, a method of wireless communication at a receiver, a wireless communication apparatus, and a computer-readable medium storing code for a wireless communication apparatus, for PRT sequence determination. A receiver may transmit control information that includes a set of one or more peak reduction tone (PRT) sequences, a resource allocation spanning a set of multiple tones, and a PRT sequence selection parameter. The receiver may then receive a waveform on a subset of the multiple tones based on the set of one or more PRT sequences and the PRT sequence selection parameter.

These and other aspects of the invention will become more fully understood upon a review of the detailed description, which follows. Other aspects, features, and embodiments will become apparent to those of ordinary skill in the art, upon reviewing the following description of specific, exemplary embodiments in conjunction with the accompanying figures. While the following description may discuss various advantages and features relative to certain embodiments and figures, all embodiments can include one or more of the advantageous features discussed herein. In other words, while this description may discuss one or more embodiments as having certain advantageous features, one or more of such features may also be used in accordance with the various embodiments discussed herein. In similar fashion, while this description may discuss exemplary embodiments as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, those skilled in the art will readily recognize that these concepts may be practiced without these specific details. In some instances, this description provides well known structures and components in block diagram form in order to avoid obscuring such concepts.

While this description describes aspects and embodiments by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

Figure 1:
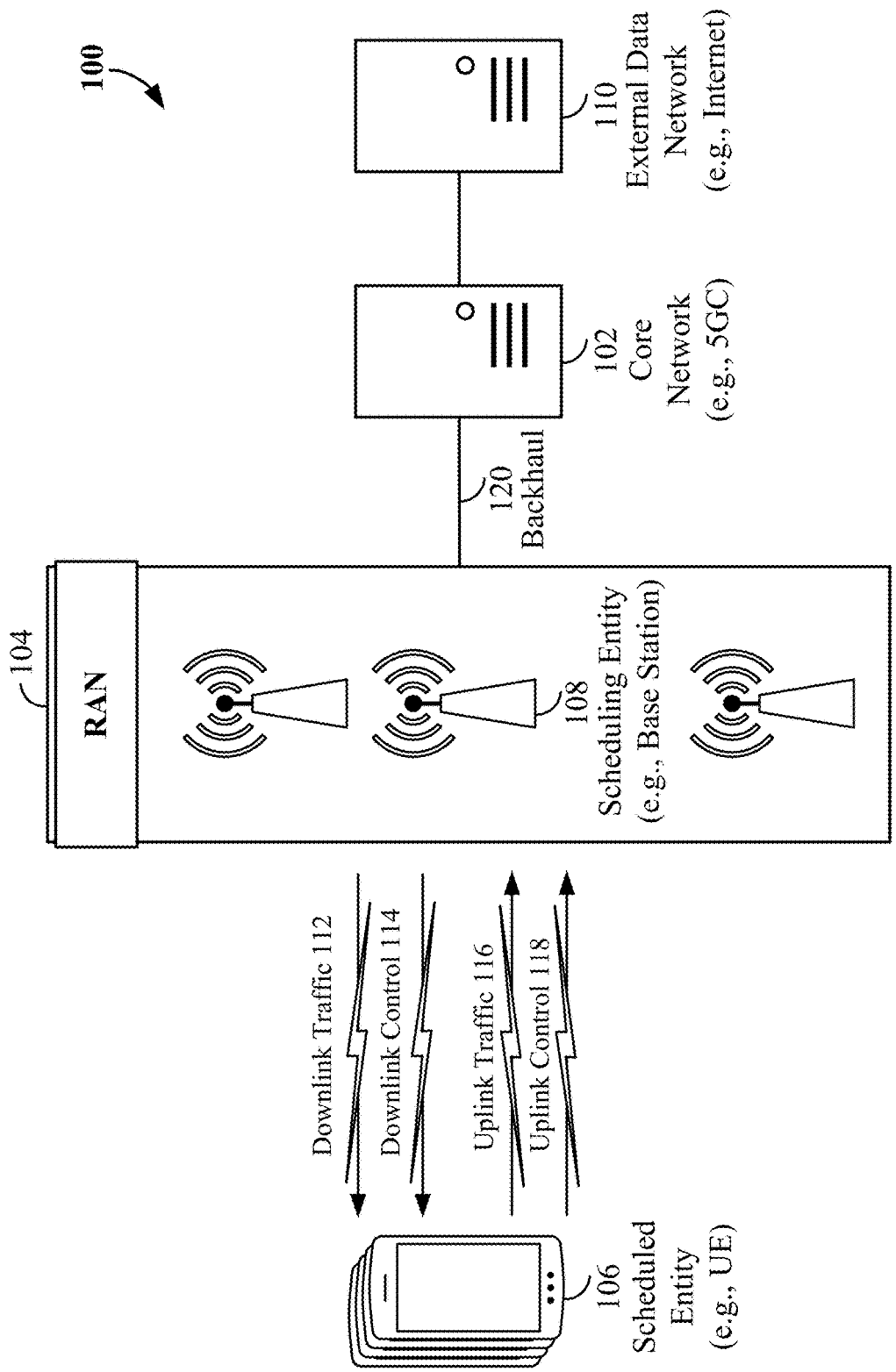
FIG. 1 is a schematic illustration of a wireless communication system according to some aspects.

The disclosure that follows presents various concepts that may be implemented across a broad variety of telecommunication systems, network architectures, and communication standards. Referring now to FIG. 1, as an illustrative example without limitation, this schematic illustration shows various aspects of the present disclosure with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 supports wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5 GC). In other examples, the core network 102 may be configured according to a 4G evolved packet core (EPC), or any other suitable standard or configuration.

Figure 2:
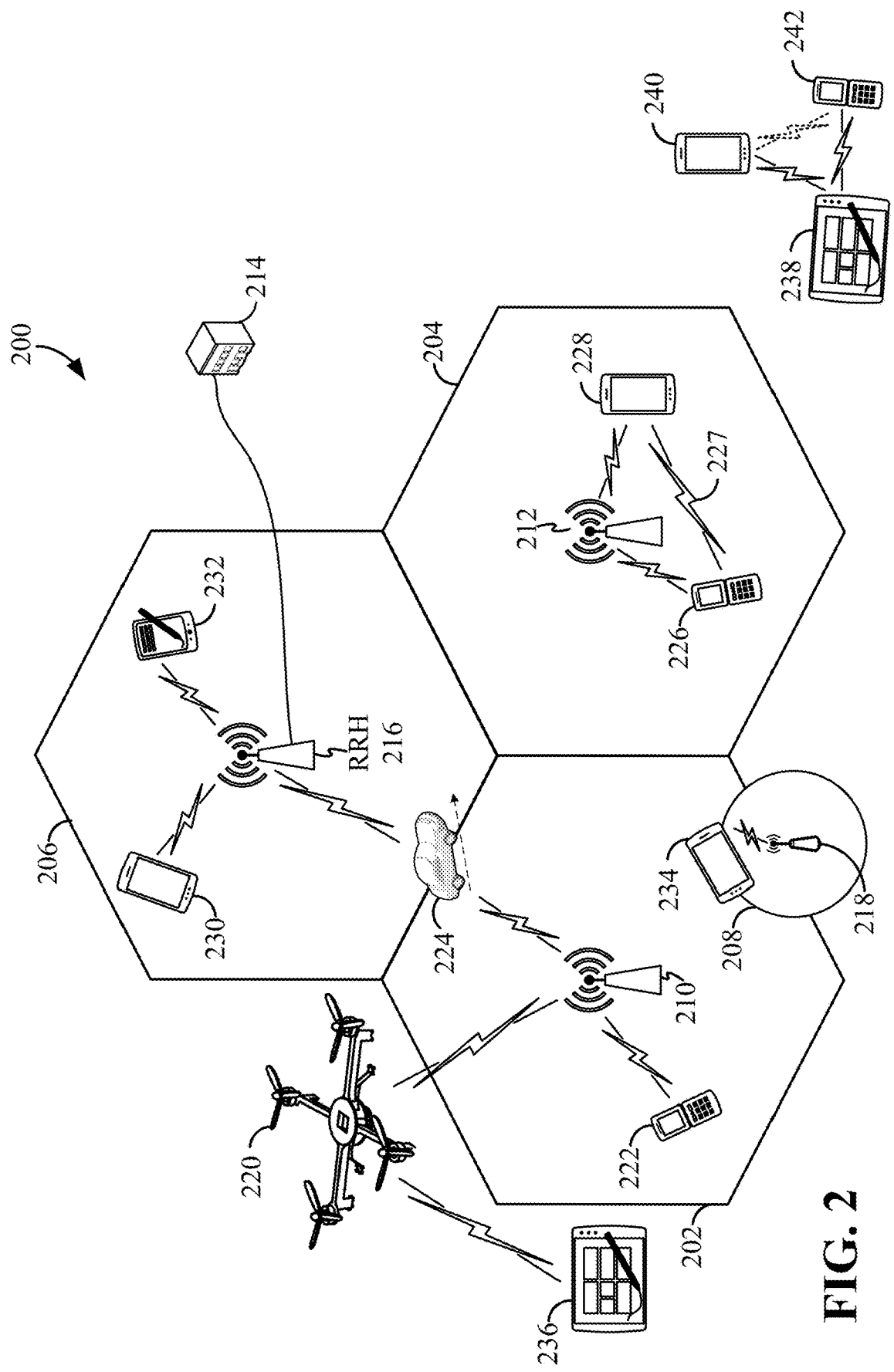
FIG. 2 is a conceptual illustration of an example of a radio access network according to some aspects.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time—frequency resources and having a cellular configuration, a P2P configuration, or a mesh configuration, a scheduling entity and one or more scheduled entities may communicate utilizing the scheduled resources.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes. For example, a UE may provide for UL multiple access utilizing time division multiple access (TDMA), code division multiple access (CDMA), frequency division multiple access (FDMA), sparse code multiple access (SCMA), resource spread multiple access (RSMA), or other suitable multiple access schemes. Further, a base station 210 may multiplex DL transmissions to UEs 222 and 224 utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Various aspects of the present disclosure will be described with reference to an OFDM waveform, schematically illustrated in FIG. 3. It should be understood by those of ordinary skill in the art that the various aspects of the present disclosure may be applied to a DFT-s-OFDMA waveform in substantially the same way as described herein below. That is, while some examples of the present disclosure may focus on an OFDM link for clarity, it should be understood that the same principles may be applied as well to DFT-s-OFDMA waveforms.

In some examples, a frame may refer to a predetermined duration of time (e.g., 10 ms) for wireless transmissions. And further, each frame may consist of a set of subframes (e.g., 10 subframes of 1 ms each). On a given carrier, there may be one set of frames in the UL, and another set of frames in the DL. Referring now to FIG. 3, an expanded view of an exemplary DL subframe 302 is illustrated, showing an OFDM resource grid 304. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers or tones.

The resource grid 304 may be used to schematically represent time-frequency resources for a given antenna port. That is, in a MIMO implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A UE generally utilizes only a subset of the resource grid 304. An RB may be the smallest unit of resources that can be allocated to a UE. Thus, the more RBs scheduled for a UE, and the higher the modulation scheme chosen for the air interface, the higher the data rate for the UE.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each subframe 302 (e.g., a 1ms subframe) may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., 1, 2, 4, or 7 OFDM symbols). These mini-slots may in some cases be transmitted occupying resources scheduled for ongoing slot transmissions for the same or for different UEs.

An expanded view of one of the slots 310 illustrates the slot 310 including a control region 312 and a data region 314. In general, the control region 312 may carry control channels (e.g., PDCCH), and the data region 314 may carry data channels (e.g., PDSCH or PUSCH). Of course, a slot may contain all DL, all UL, or at least one DL portion and at least one UL portion. The simple structure illustrated in FIG. 3 is merely exemplary in nature, and different slot structures may be utilized, and may include one or more of each of the control region(s) and data region(s).

Figure 3:
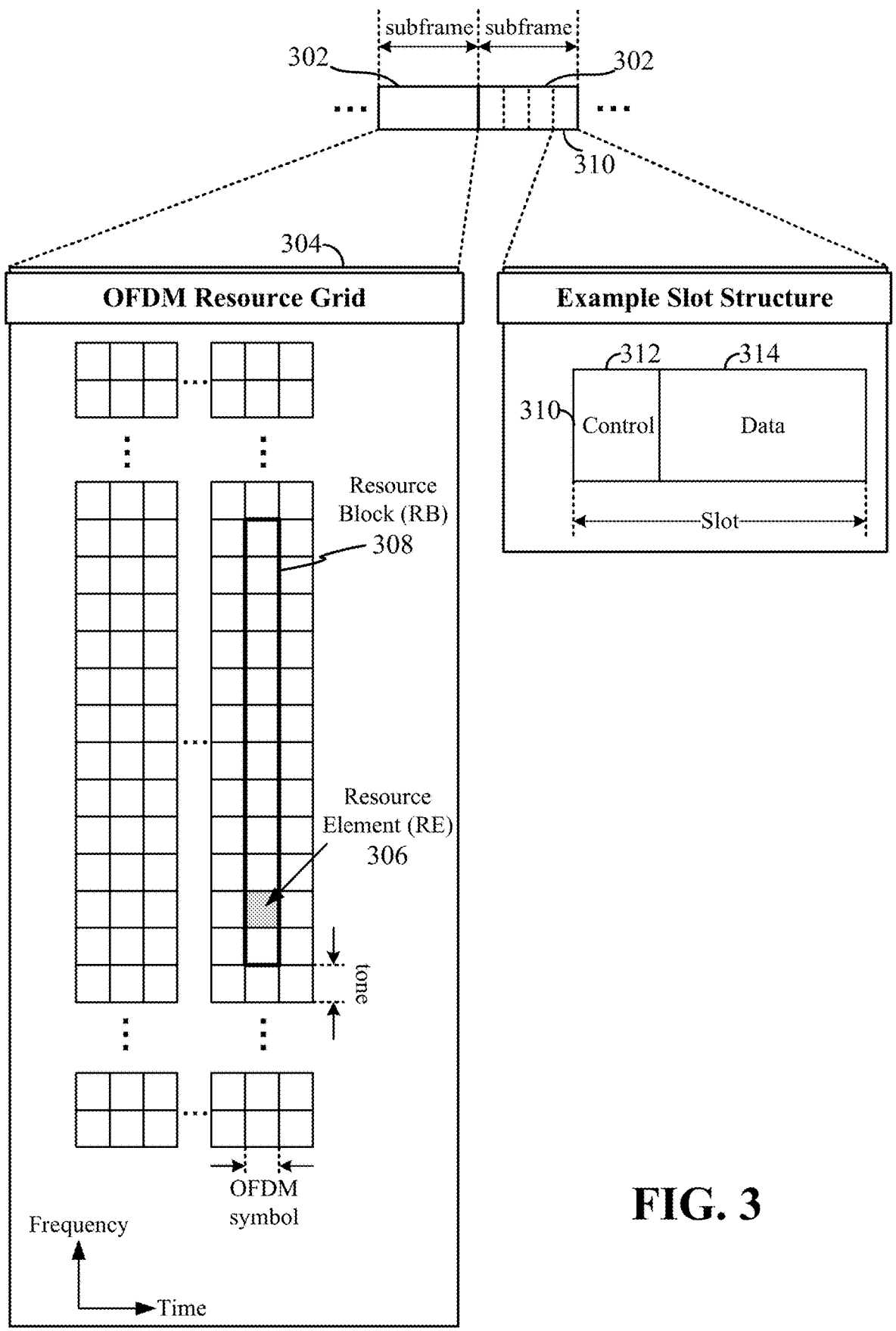
FIG. 3 is a schematic illustration of an organization of wireless resources in an air interface utilizing orthogonal frequency divisional multiplexing (OFDM) according to some embodiments.

Although not illustrated in FIG. 3, the various REs 306 within an RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

Figure 4:
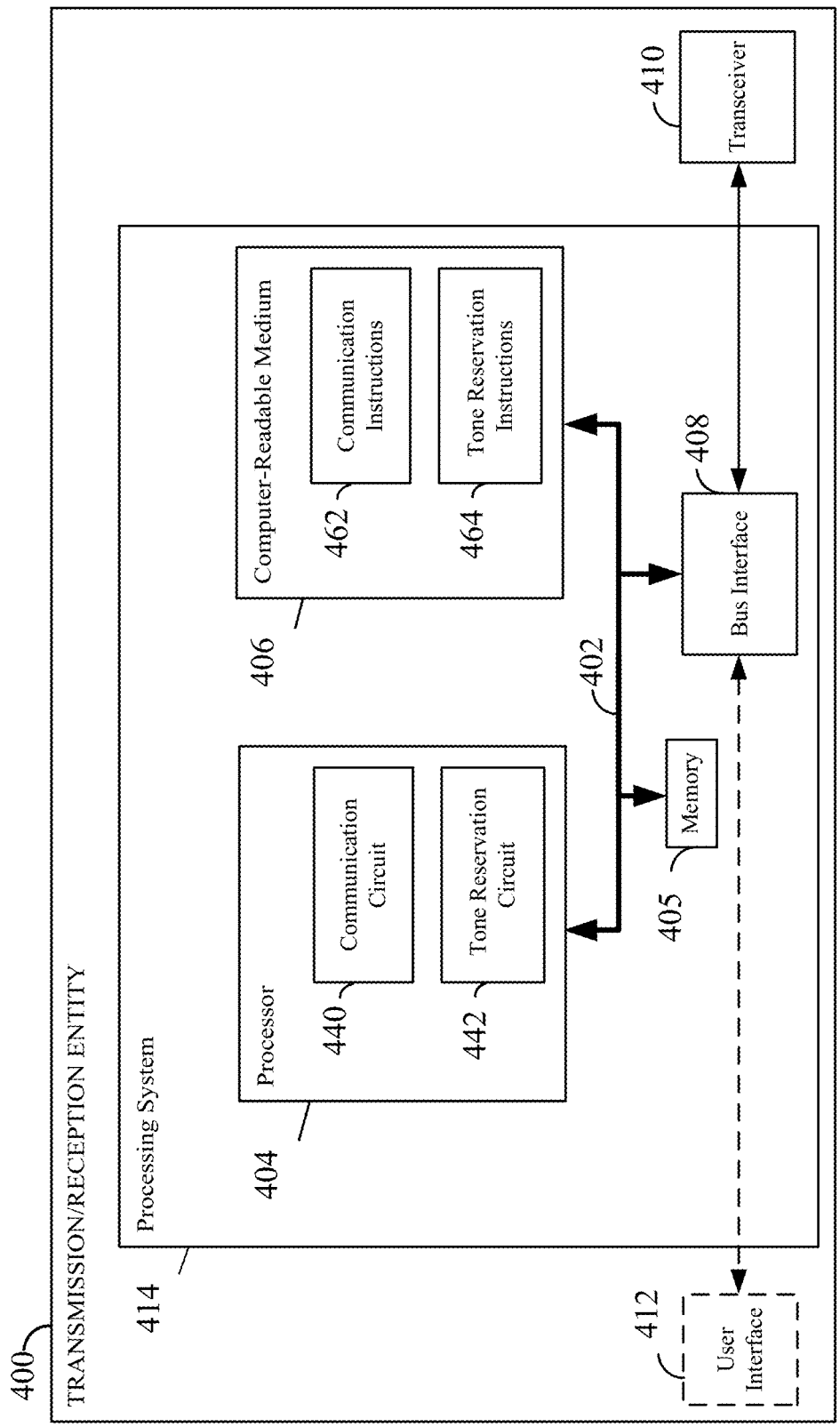
FIG. 4 is a block diagram conceptually illustrating an example of a hardware implementation for a transmission/reception entity according to some aspects of the disclosure.

FIG. 4 is a block diagram illustrating an example of a hardware implementation for a transmission/reception entity 400 employing a processing system 414. For example, the transmission reception entity 400 may be a gNB, NG-eNB, eNB, or any other suitable transmission reception point (TRP), as illustrated in any one or more of FIGS. 1 and/or 2. In further examples, the transmission/reception entity 400 may be a UE as illustrated in any one or more of FIG. 1 or 2. In other various examples, the transmission reception entity may be any suitable wireless communication apparatus configured as described herein.

The transmission/reception entity 400 may be implemented with a processing system 414 that includes one or more processors 404. Examples of processors 404 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the transmission/reception entity 400 may be configured to perform any one or more of the functions described herein. That is, the processor 404, as utilized in a transmission/reception entity 400, may be configured (e.g., in coordination with the memory 405) to implement any one or more of the processes and procedures described below and illustrated in FIGS. 7 and/or 8.

In this example, the processing system 414 may be implemented with a bus architecture, represented generally by the bus 402. The bus 402 may include any number of interconnecting buses and bridges depending on the specific application of the processing system 414 and the overall design constraints. The bus 402 communicatively couples together various circuits including one or more processors (represented generally by the processor 404), a memory 405, and computer-readable media (represented generally by the computer-readable medium 406). The bus 402 may also link various other circuits such as timing sources, peripherals, voltage regulators, and power management circuits, which are well known in the art, and therefore, will not be described any further. A bus interface 408 provides an interface between the bus 402 and a transceiver 410. The transceiver 410 provides a communication interface or means for communicating with various other apparatus over a transmission medium. Depending upon the nature of the apparatus, a user interface 412 (e.g., keypad, display, speaker, microphone, joystick) may also be provided. Of course, such a user interface 412 is optional, and may be omitted in some examples, such as a base station.

In some aspects of the disclosure, the processor 404 may include communication circuitry 440 configured (e.g., in coordination with the memory 405) for various functions, including, e.g., transmitting or receiving a resource allocation, and transmitting or receiving data waveforms including any suitable control and/or data information. For example, the communication circuitry 440 may be configured to implement one or more of the functions described below in relation to FIG. 7, including, e.g., blocks 701, 702, 704, 706, and/or 718. In some aspects of the disclosure, the processor 404 may further include tone reservation circuitry 442 configured (e.g., in coordination with the memory 405) for various functions, including, e.g., determining to designate a certain number of tones as peak reduction tones (PRT), and selecting particular tones within a resource allocation to be the PRTs based on a PRT sequence selection algorithm. For example, the tone reservation circuitry 442 may be configured to implement one or more of the functions described below in relation to FIG. 7, including, e.g., block 708, 710, 712, 714, and/or 716. The tone reservation circuitry 442 may further be configured to implement one or more of the functions described below in relation to FIG. 8, including, e.g., block 802, 804, 806, 808, and/or 810.

The processor 404 is responsible for managing the bus 402 and general processing, including the execution of software stored on the computer-readable medium 406. The software, when executed by the processor 404, causes the processing system 414 to perform the various functions described below for any particular apparatus. The computer-readable medium 406 and the memory 405 may also be used for storing data that is manipulated by the processor 404 when executing software.

One or more processors 404 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 406. The computer-readable medium 406 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 406 may reside in the processing system 414, external to the processing system 414, or distributed across multiple entities including the processing system 414. The computer-readable medium 406 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 406 may store computer-executable code that includes communication instructions 462 that configure a transmission/reception entity 400 for various functions, including, e.g., transmitting or receiving a resource allocation, and transmitting or receiving data waveforms including any suitable control and/or data information. For example, the communication instructions 462 may be configured to cause a transmission/reception entity 400 to implement one or more of the functions described below in relation to FIG. 7, including, e.g., blocks 701, 702, 704, 706, and/or 718. In some aspects of the disclosure, the computer-readable storage medium 406 may store computer-executable code that includes tone reservation instructions 464 that configure a transmission/reception entity 400 for various functions, including, e.g., determining to designate a certain number of tones as peak reduction tones (PRT), and selecting particular tones within a resource allocation to be the PRTs based on a PRT sequence selection algorithm. For example, the tone reservation instructions 464 may be configured to cause a transmission/reception entity 400 to implement one or more of the functions described below in relation to FIG. 7, including, e.g., block 708, 710, 712, 714, and/or 716. The tone reservation instructions 464 may further be configured to cause a transmission/reception entity 400 to implement one or more of the functions described below in relation to FIG. 8, including, e.g., block 802, 804, 806, 808, and/or 810.

In one configuration, the transmission/reception entity 400 includes means for transmitting or receiving a resource allocation, means for transmitting or receiving data waveforms including any suitable control and/or data information, means for designating a certain number of tones as peak reduction tones (PRT), and means for selecting particular tones within a resource allocation to be the PRTs based on a PRT sequence selection algorithm. In one aspect, the aforementioned means may be the processor 404 shown in FIG. 4 configured to perform the functions recited by the aforementioned means. In another aspect, the aforementioned means may be a circuit or any apparatus configured to perform the functions recited by the aforementioned means.

Figure 7:
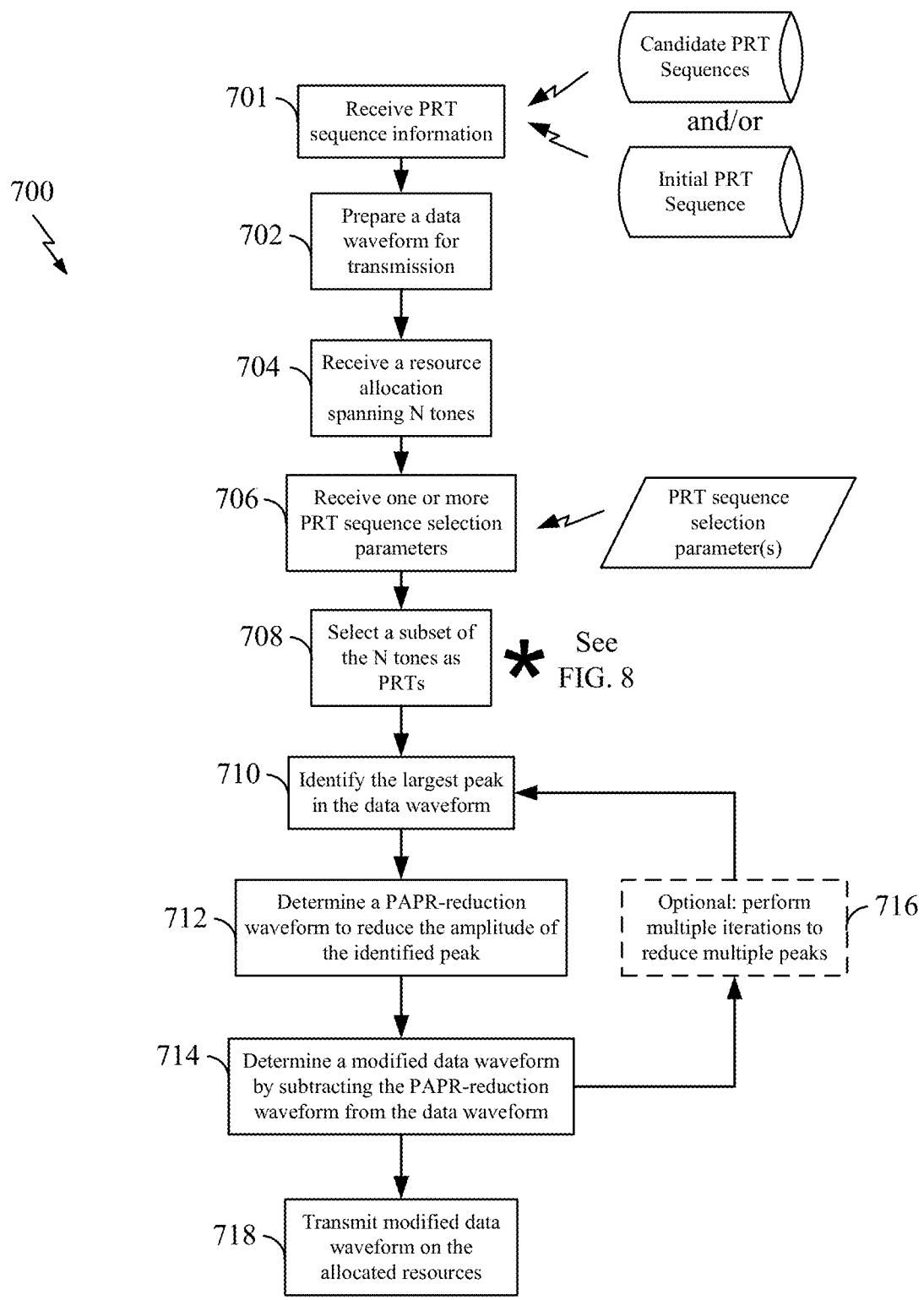
FIG. 7 is a flow chart illustrating an exemplary process for peak-to-average power ratio (PAPR) reduction based on a TR algorithm according to some aspects of the disclosure.

Of course, in the above examples, the circuitry included in the processor 404 is merely provided as an example, and other means for carrying out the described functions may be included within various aspects of the present disclosure, including but not limited to the instructions stored in the computer-readable storage medium 406, or any other suitable apparatus or means described in any one of the FIGS. 1 and/or 2, and utilizing, for example, the processes and/or algorithms described herein in relation to FIGS. 7 and/or 8.

When an apparatus such as the transmission/reception entity 400 undertakes to communicate over a wireless channel, a transceiver (e.g., transceiver 410) provides for wireless communication functions using one or more antennas. The transceiver 410 receives an input waveform for transmission and applies a power amplifier (PA) to the waveform. The PA drives the antenna(s) and executes a transmission. However, a PA generally has a limit to the power $P_{in}$ of an input waveform that it can amplify. And further, PA operation with a high input power, at or near this limit, may result in nonlinear behavior. In other words, at a relatively low input power, amplitude variations in the PA's input waveform provide for generally proportional variations in the power of an amplified output waveform $P_{out}$. But at a very high input power (e.g., above the PA's saturation point $P_{sat}$) the PA's amplification factor ($P_{out}/P_{in}$) can vary as a function of $P_{in}$. For example, a PA may not be capable of amplifying an input waveform that has an input power $P_{in}$ that is well above the saturation point $P_{sat}$.

This nonlinear behavior can result in in-band and out-of-band distortion of the amplified waveform, not only corrupting the intended waveform and degrading a receiver's error vector magnitude (EVM), but also increasing interference outside the intended transmission bandwidth, or an adjacent channel leakage ratio (ACLR).

To avoid this non-linearity, a transceiver (e.g., transceiver 410) may be configured to apply input waveforms to the PA that have a mean input power $P_{\mu\_in}$ of several dB lower than the saturation point. For example, a suitable mean input power level $P_{\mu\_in}$ may be one that maintains the amplified output signal at a peak-to-average power ratio (PAPR=$P_{peak\_out}/P_{\mu\_out}$) below a certain threshold level. Here, denote the peak output power as $P_{peak\_out}$ and denote the mean output power as $P_{\mu\_out}$ (e.g., computed over a time period corresponding to an OFDM symbol, or any other suitable duration or time period). For example:

$$PAPR=(P_{peak\_out}/P_{\mu\_out})<P_{Threshold}<P_{sat}$$

However, the PAPR of the output signal depends on more than just the PA saturation point. Even if there were a perfectly linear, ideal PA, the PAPR may still be high if the intended waveform to be transmitted has high peaks in its power. For example, the waveform of an OFDM transmission is known to exhibit a significant PAPR, generally rising with increases in an OFDM block size, or the maximum number of subcarriers or tones within a component carrier. With a fixed subcarrier spacing, the number of subcarriers increases as the bandwidth grows. Because one aim of 5G NR is to provide higher data rates than 4G LTE, NR may utilize an even larger block size than LTE, further increasing the PAPR.

There exist several techniques to effectively reduce the PAPR of an OFDM waveform. However, existing techniques are generally data-dependent and computationally expensive, making them unsuitable for an OFDM transmitter to implement in real-time. Current industry participants typically apply a clipping and filtering (CF) technique to reduce the PAPR. However, CF can result in in-band distortion of the amplified waveform, and may not provide a suitable PAPR reduction solution.

As the available bandwidth allocated for cellular networks continues to increase, networks that use OFDM often exploit the extra bandwidth to mitigate multipath fading, by using longer OFDM symbols (with OFDM, a longer symbol duration accompanies a greater number of subcarriers). However, as those of ordinary skill in the art will recognize, this technique can further increase the PAPR.

On the other hand, if an excess of bandwidth is available, a further PAPR reduction technique called tone reservation (TR) becomes practical. Broadly, TR means that for a given OFDM symbol, a transmitter transmits a suitable PAPR-reduction waveform on what would otherwise be idle tones. These idle tones are also equivalently called reserved tones, or peak reduction tones (PRT). The receiver may then ignore the signal on the PRTs, and only decode the tones that carry data (data-bearing tones). As a point of reference, a UE that receives a grant for 2 RBs=24 tones may reasonably select half of those tones, or 12 tones, as PRTs.

Figure 5:
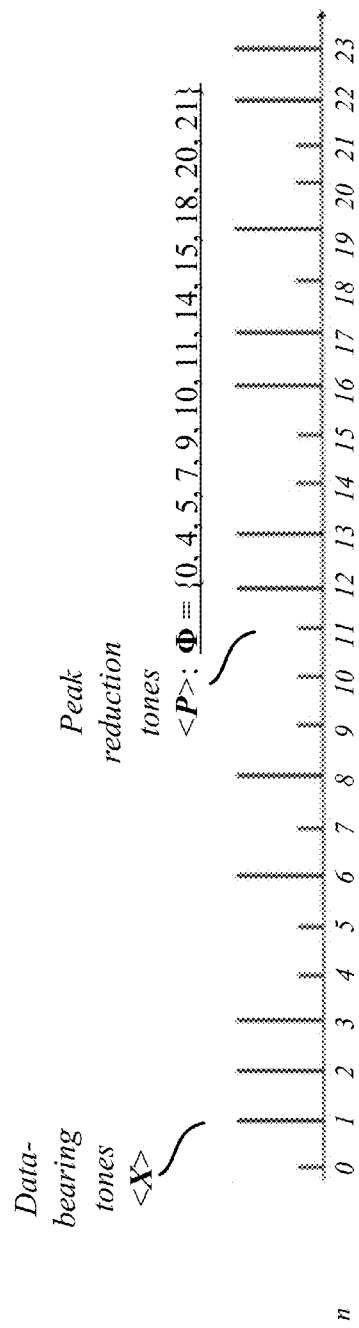
FIG. 5 is a frequency-domain illustration of one example of peak reduction tone (PRT) distribution among a set of data-bearing tones.

For example, FIG. 5 is a frequency-domain representation of such a 2-RB resource allocation including one example of a mix of 12 PRTs (illustrated as short bars) and 12 data-bearing tones (illustrated as long bars). In this example, an OFDM information message may be transmitted utilizing the data-bearing tones. And although this information transmission is sent utilizing a 2-RB (12 tone) bandwidth, in this example, an availability of an idle RB provides an opportunity for the transmitting device to utilize that additional bandwidth for PAPR reduction. Thus, with a suitable spreading in frequency of the data-bearing tones, and insertion of suitable PRTs among the data-bearing tones, the PAPR of the transmission can be reduced.

That is, a tone reservation (TR) technique provides for a transmitter to configure the amplitude and phase of a PAPR-reduction waveform on the PRTs, to reduce or minimize the PAPR for that OFDM symbol. To maintain a low PAPR using a TR technique, a transmitter may select a suitable set of PRTs, and/or adjust the amplitude/phase of the PAPR-reduction waveforms on the PRTs, for each OFDM symbol. Because the transmitter can put the PAPR-reduction waveforms on a set of tones (PRTs) that does not overlap with a set of data-bearing tones, the TR technique can effectively reduce the PAPR with little to no effect on an EVM or ACLR.

When a transmitter uses a TR technique, a receiver of its transmission should be aware of which tones are PRTs. In some examples, a transmitter and a receiver may exchange signaling to come to an agreement as to which tones are PRTs. Although a real-time selection of PRTs per symbol may allow a transmitter to optimize its performance, this feature may result in large signaling overhead. In particular, the set of tones that are PRTs (i.e., the PRT sequence) may be signaled from one entity to another (either from the transmitter to the receiver, or from the receiver to the transmitter) as a bitmask. For example, when a transmitting device has a resource allocation corresponding to a set of N tones, a bitmask that includes N bits, with each bit representing whether a corresponding tone is a PRT, can be quite substantial for a wideband resource allocation.

In other examples, a transmitter and receiver may establish a fixed or static set of tones as PRTs a priori, such that the real time reporting is unneeded. While this approach can result in a reduced signaling overhead, the flexibility of PRT sequence selection may be eliminated. And in many instances, providing for flexibility in PRT sequence selection can provide an ability to improve PAPR reduction performance based on factors such as the particular set of allocated RBs, the modulation and coding scheme (MCS) the transmitter uses on its transmission, etc.

Accordingly, aspects of the present disclosure provide for a dynamic PRT resource allocation that can avoid the large cost in signaling overhead that may result from previous approaches. As discussed further below, in some examples, a TR algorithm or technique may be preceded by an assignment or allocation to a transmitter of multiple candidate PRT sequences. Here, the transmitter may store the set of candidate PRT sequences in memory, in a manner where each candidate PRT sequence is addressed or indexed in a known way. In this way, rather than signaling a bitmask to explicitly indicate a PRT sequence selection, a PRT sequence selection signal, index, or address may be signaled to indicate a selected PRT sequence among those in the set of candidate PRT sequences.

In some other examples, also discussed further below, a TR algorithm or technique may be preceded by an assignment or allocation of an initial PRT sequence. Here, the transmitter may store the initial PRT sequence in memory. In this example, the transmitter may have a function or capability of modifying or altering the initial PRT sequence based on one or more parameters, such as an information element dynamically signaled between the receiver and transmitter. For example, a modification parameter may indicate a cyclic or circular shift to apply to the initial PRT sequence for a given transmission or set of transmissions. In another example, a modification parameter may indicate a down-sampling factor to apply to the initial PRT sequence for a given transmission or set of transmissions.

Various examples of these and other illustrative embodiments are described below in connection with a TR algorithm or technique for PAPR reduction.

One example of a TR algorithm or technique that may be utilized in accordance with some aspects of the present disclosure is set forth below. This algorithm corresponds to a signal-to-clipping noise ratio, tone reservation (SCR-TR) algorithm, as it may be referred to within the field. In the example that follows, a transmitter that implements the exemplary TR algorithm may have a resource allocation or grant for resources that span a set of N tones or subcarriers. The set of N granted tones $\{Tone_n\}$ may be indexed by a set of N consecutive integers $n \in \{0, \ldots, N-1\}$ that represent tone indexes. Denote a subset $\{PRT_\Phi\} \subset \{Tone_n\}$ of the set of N granted tones $\{Tone_n\}$ as PRTs. That is, D is an M-element set of tone indexes, where M<N. Further, all elements of $\Phi$ are within the set $\{0, \ldots, N-1\}$. The transmitter may allocate the remaining tones with indexes outside the subset $\Phi$ as data-bearing tones.

This disclosure provides a process for selecting suitable tones to be PRTs (i.e., a PRT sequence) in a later section. In the discussion that immediately follows, it can be assumed that a transmitter has identified a suitable set of tones to be PRTs.

Based on the tone index subset $\Phi$, a frequency-domain kernel P may be constructed where the nonzero elements of P correspond to the tone indexes of the tones the transmitter selects as PRTs. Other elements of P that do not correspond to the tone indexes of the PRTs (i.e., data-bearing tones) have a zero (0) value. That is, P is an N-element set of values corresponding to a PRT transmission in a given OFDM symbol.

$$P = \{P_1, \ldots, P_N\}$$

Thus, if $P_n$ represents the tone at tone index n, then:

$$P_n = \begin{cases} 1 & \text{if } n \in \Phi \\ 0 & \text{otherwise} \end{cases}$$

Referring now to FIG. 5, an example frequency-domain kernel P is illustrated, corresponding to an arbitrarily selected PRT sequence D corresponding to the following:

$$\Phi_{FIG.\ 5} = \{0,4,5,7,9,10,11,14,15,18,20,21\}$$

$$P_{FIG.\ 5} = \{1,0,0,0,1,1,0,1,0,1,1,1,0,0,1,1,0,0,1,0,1,1,0,0\}$$

A time-domain kernel waveform p corresponding to the frequency-domain kernel P may be defined as:

$$p = IFFT(P)$$

One feature of a time-domain kernel waveform p constructed in this manner is that if the transmitter selects a sufficiently large number of tones as PRTs, and chooses suitable locations for them, the time domain waveform p begins to resemble a delta function with negligible sidelobes (e.g., a single, sharp peak). And further, because P is defined such that all nonzero values are real numbers (i.e., a value of 1), the phase of P is zero, and the peak value of P is located at time 0. Thus, whatever the exact waveform p may take, denote the peak amplitude of the time-domain kernel waveform p at time 0 as |p(0)|.

By defining p as IFFT(P), a circular shift of p in the time domain does not affect the location of the PRTs in the frequency domain kernel P (i.e., does not affect the subset of tones included in Φ). However, such a circular shift of p does affect the phase of the PRTs.

As discussed above, the remaining tones of the granted resources that the transmitter does not select as PRTs are available to carry data. Denote X as the frequency-domain data:

$$X = \{X_1, \ldots, X_N\}$$

Here, $X_n$ represents the data-bearing tone at index n. That is, X is an N-element set of complex values corresponding to a data transmission in a given OFDM symbol. Here, because the elements of X span the full set of N granted tones, $X_n=0$ if $n \in \Phi$. That is, PRTs do not include part of the frequency-domain data, and data-bearing tones do not coincide with PRTs.

As with the kernel, denote the time-domain data waveform x as:

$$x = IFFT(X)$$

Figure 6:
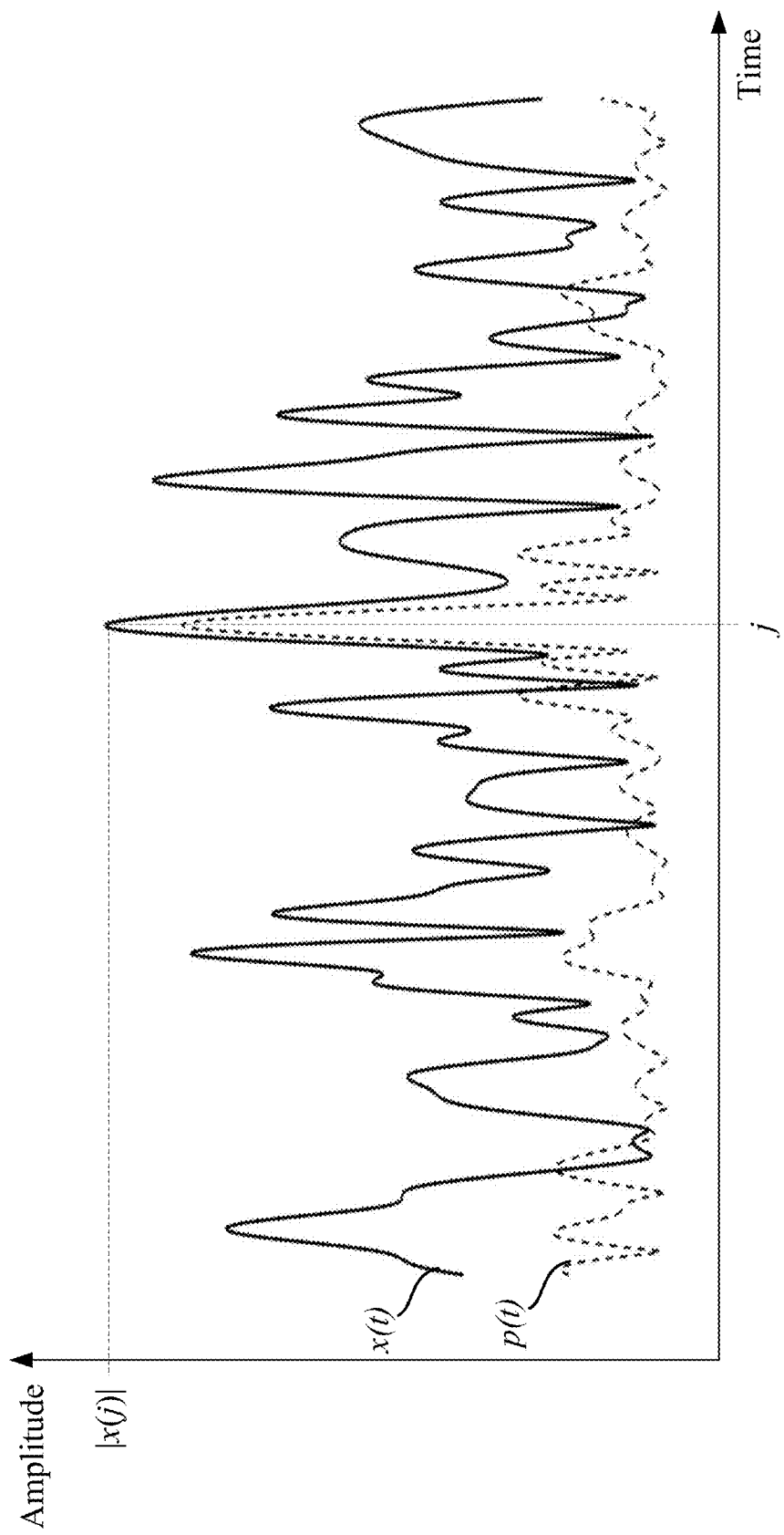
FIG. 6 is a time-domain chart illustrating a peak reduction process based on a tone reservation (TR) algorithm according to some aspects of the disclosure.

Further, the amplitude of the time-domain data waveform x at time t may be denoted as x(t). Referring now to FIG. 6, a chart provides an example of a time-domain data waveform x(t) corresponding to an arbitrary set of data, selected only for the purpose of illustration.

For the purpose of the TR technique for PAPR reduction, the transmitter may identify the time of the largest peak in the time-domain data waveform x. This peak becomes the target peak for the transmitter to reduce to improve the PAPR. Denote the peak of this target as |x(j)|, where the time index of this target is at time t=j.

Once the transmitter identifies the peak in x, the transmitter circularly shifts the time-domain kernel p to align its peak with the identified peak in x, at time j. Here, denote the circularly shifted version of p as:

$$p^j = \text{circshift}(p, j)$$

FIG. 6 further illustrates an example circularly shifted time-domain kernel p(t) corresponding to an arbitrary set of PRTs with arbitrary values in each PRT, selected only for the purpose of illustration.

As discussed above, this circular shift of the time-domain kernel p corresponds to a phase shift of the frequency-domain kernel P. Denote this phase shift applied to P to align the peak of the time-domain kernel p with the peak of the time-domain data waveform x (identified at time j) as $<x(j)$. That is, $<x_{(j)}$ is the phase of x(j).

With the time-domain peaks corresponding to the PRTs and the data aligned, the transmitter may determine a suitable scaling parameter a for scaling $p^j$, such that the transmitter can utilize the scaled peak of $p^j$ to reduce the peak at x(j) (shown as |x(j)|) to a suitable reduced peak value, which may be denoted μ. That is, the transmitter may determine a suitable value for scaling factor a such that it may reduce |x(l)| to μ by subtracting a scaled and shifted time-domain kernel p from the time-domain waveform x. For example:

$$a = \frac{|x(j)| - \mu}{p(0)}$$

Thus, a scaled and shifted time-domain kernel $a \cdot p^j \cdot e^{i<(j)}$ may be calculated as follows:

$$\frac{|x(j)| - \mu}{p(0)} p^j e^{i<x(j)}$$

The transmitter then subtracts this scaled and shifted time-domain kernel from the time-domain data waveform x to obtain a modified time-domain data waveform $x_{new}$:

$$x_{new} = x - \frac{|x(j)| - \mu}{p(0)} p^j e^{i<x(j)}$$

Here, i represents an imaginary number, i.e., $i = \sqrt{-1}$. Here, the modified time-domain data waveform $x_{new}$ represents the time-domain data waveform x(t) as it might be seen by a receiver, when it is multiplexed with the scaled and shifted time-domain kernel, discussed above. That is, the actual data signal x(t)=IFFT(X) is not modified in the data-bearing tones, but rather, by multiplexing this data signal with the above-determined scaled and shifted time-domain kernel, carried in the PRTs, the PAPR of the combined signal can be reduced. To further reduce the PAPR in a data waveform x that has several peaks, the transmitter can run several iterations of the above algorithm to reduce several peaks in x.

In the description that immediately follows, a further example of an SCR-TR algorithm is provided, where an apparatus (e.g., a transmitter employing a TR algorithm in its transmission, and/or a receiver receiving the transmission) may determine the tone indexes for a suitable subset of allocated tones to act as PRTs (e.g., a PRT sequence Φ) in a transmission. In some examples, the apparatus may determine a PRT sequence Φ as described herein for each OFDM symbol. In other examples, the apparatus may determine a PRT sequence Φ for a plurality of OFDM symbols. That is, in an aspect of this disclosure, a PRT sequence Φ may vary over time (e.g., per OFDM symbol, per slot, per subframe, per frame, or over any suitable time interval).

FIG. 7 is a flow chart illustrating an exemplary process 700 for PAPR reduction for a wireless transmission in accordance with some aspects of the present disclosure. As described below, some or all illustrated features may be omitted in a particular implementation within the scope of the present disclosure, and some illustrated features may not be required for implementation of all embodiments. In some examples, the process 700 may be carried out by the transmission/reception entity 400 illustrated in FIG. 4. In some examples, the process 700 may be carried out by any suitable apparatus or means for carrying out the functions or algorithm described below.

At block 701, a transmitter may receive PRT sequence information. For example, a UE may receive signaling from a gNB that communicates the PRT sequence information, e.g., carried over any suitable channel and in any suitable format. In some examples, a gNB may transmit the PRT sequence information over radio resource control (RRC) signaling, while in some other examples, a gNB may transmit the PRT sequence information over a medium access control (MAC) control element (MAC-CE).

In some aspects, the PRT sequence information may include a set of multiple candidate PRT sequences. That is, a gNB may communicate to a UE a set of any suitable number of candidate PRT sequences, from which later signaling (e.g., see block 706 below) can be employed to select a PRT sequence. Here, the different candidate PRT sequences may have different numbers of elements, may all have the same number of elements, or may include sets of candidate PRT sequences with different numbers of elements.

And in some aspects, the PRT sequence information may include an initial PRT sequence. That is, a gNB may communicate to a UE a suitable initial PRT sequence, which later signaling (e.g., see block 706 below) can be employed to modify the initial PRT sequence to obtain a modified PRT sequence. Here, a suitable initial PRT sequence may be one generally known to provide for robust PAPR reduction performance in a TR algorithm. For example, certain random or pseudo-random sequences have been shown to exhibit good performance, providing for a PAPR reduction signal having a high, narrow peak and small side lobes.

In further aspects, the PRT sequence information may include both an initial PRT sequence, and a set of multiple candidate PRT sequences.

In a still further aspect, the transmitter may store in memory the received PRT sequence information. Here, when the PRT sequence information includes a set of multiple candidate PRT sequences, the transmitter may structure the stored PRT sequence information by utilizing a suitable index or addressing system as needed, to identify a selected PRT sequence based on later signaling (e.g., see block 706 below).

At block 702, a transmitter may prepare a data waveform X=FFT(x) (e.g., an input waveform for a PA) for wireless transmission. The input waveform may be, but need not be an OFDM waveform. The input waveform may include any suitable data or format for transmission.

At block 704, the transmitter may receive a resource allocation for data transmission. Here, the resource allocation may span any suitable number of tones, e.g., N tones. That is, the tone indexes of the full set of N tones in the resource allocation is denoted $\{0, \ldots, N-1\}$.

At block 706, the transmitter may receive one or more PRT sequence selection parameters for the transmitter to use in connection with a PAPR reduction algorithm. In various examples, the set of one or more PRT sequence selection parameters may be carried on any suitable channel and via any suitable format. In an example where a gNB provides a PRT sequence selection parameter via DCI, the PRT sequence selection can be achieved with low latency, because such a DCI may be carried on any given slot. And further, by virtue of the PRT sequence information being separately signaled (e.g., in block 701), the PRT sequence selection can be achieved with low signaling overhead. This parameter or parameters may include, e.g., an indication such as an index or an address for the transmitter to select from among two or more PRT sequences stored in memory. This parameter or parameters may further include, e.g., an indication such as a value for the transmitter to apply for a suitable modification of an initial PRT sequence. For example, the value may indicate a length of a shift (e.g., a frequency domain shift) for the transmitter to apply to the initial PRT sequence, a down-sampling factor to apply to the initial PRT sequence, or any other suitable PRT sequence modification parameter. This parameter or parameters may further include an algorithm selection parameter, for the transmitter to select one or more of the above PRT sequence selection algorithms or techniques to apply to a transmission or transmissions.

At block 708, the transmitter may select a subset of the N tones of the resource allocation to be PRTs. For example, the transmitter may select an M-element subset $PRT_\Phi$ of the N tones to include as selected PRTs within the interval $\Phi \in \{0, \ldots, N-1\}$. That is, a PRT sequence $\Phi = \{101_1, \ldots, \Phi_M\}$. For example, an apparatus or transmitter may determine a value $\Phi_m$ for each of M elements in the PRT sequence $\{\Phi_1, \ldots, \Phi_M\}$. Here, as above, each value of $\Phi_m$ represents a tone index within a given resource allocation, and identifies the indexes of those tones that are PRTs. The apparatus determines values of $\Phi_m$, for each integer value of m from m=1 to m=M.

Figure 8:
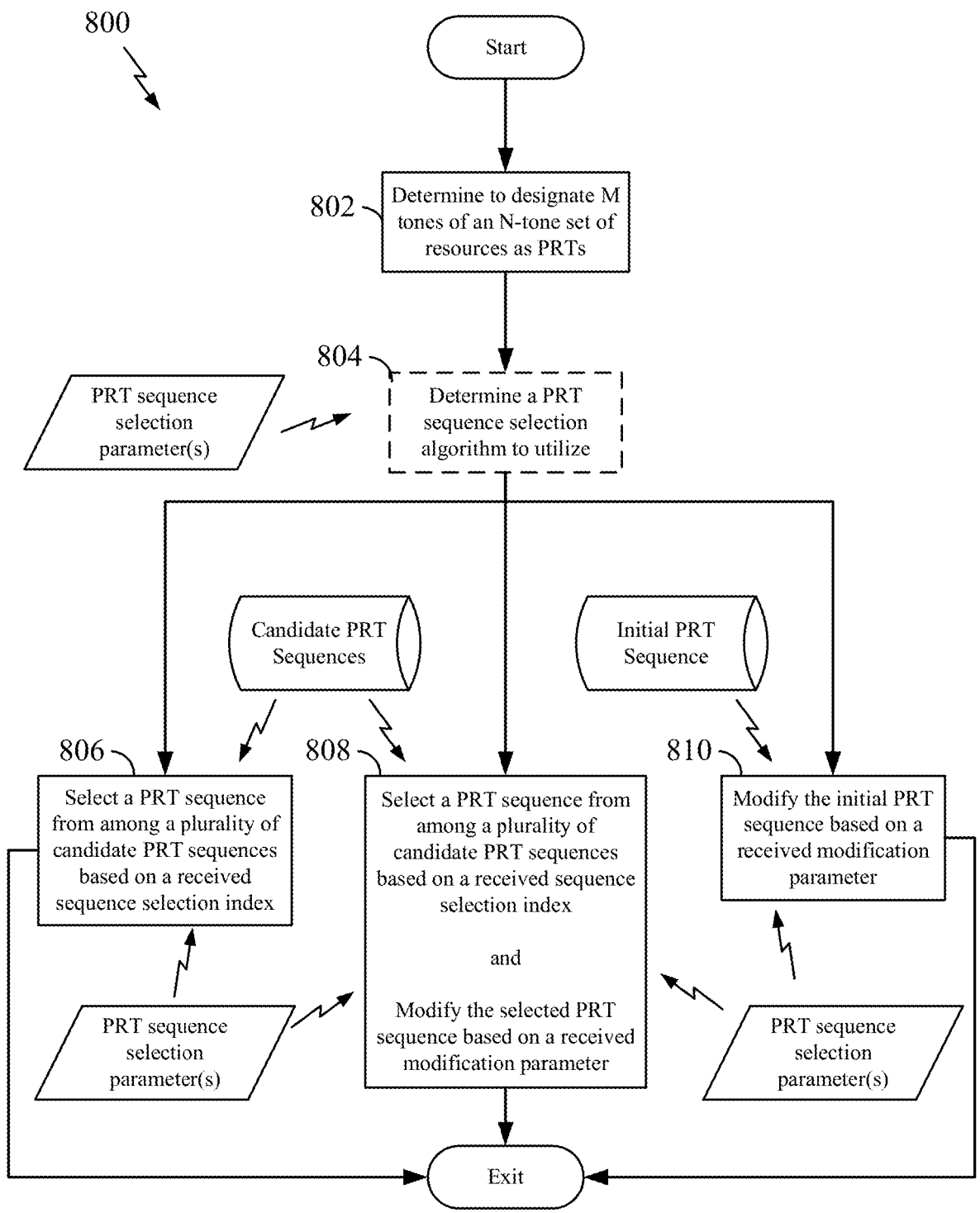
FIG. 8 is a flow chart illustrating an exemplary process for selecting a PRT sequence for a TR algorithm according to some aspects of the disclosure.

In FIG. 7, block 708 has a star to indicate that further details of some examples of this block are provided in FIG. 8.

At block 710, the transmitter may identify the largest peak |x(j)| in the time-domain data waveform x(t), and an associated time j when this peak occurs.

At block 712, the transmitter may determine a PAPR reduction waveform, corresponding to the selected PRTs, to reduce the amplitude of the identified peak. For example, as described above, the transmitter may determine a scaled and time-shifted time-domain kernel according to the equation $$\frac{|x(j)| - \mu}{p(0)} p^j e^{i \angle x(j)},$$

where $\mu$ represents the target (post-reduction) power or amplitude of a modified time-domain data signal at time j; p(0) represents the peak amplitude of the time-domain kernel waveform p; $p_j$ represents a circular-shifted version (shifted by time t=j) of the time-domain kernel waveform; <x(j) represents the phase of the time-domain data waveform x(t) at time t=j, or x(j); and $i = \sqrt{-1}$.

And at block 714, the transmitter may determine a modified data waveform by subtracting the PAPR-reduction waveform from the data waveform.

As discussed above, in some examples, a transmitter may optionally, at block 716, return to block 710 and perform multiple iterations of the algorithm of blocks 710-714 to reduce multiple peaks in the data waveform. Once the transmitter has suitably modified the data waveform, at block 718, the transmitter may transmit the modified data waveform on the allocated resources.

Accordingly, by summing or multiplexing the data waveform with the PAPR-reduction waveform, the composite transmission can have a reduced PAPR. Based on this, the transmitter can potentially increase the mean input power for the signal input to its power amplifier. That is, as discussed above, in some cases a transmitter may establish a mean input power level $P_{\mu\_in}$ such that the PAPR of the output signal power level ($P_{peak\_out}/P_{\mu\_out}$) does not exceed a given threshold. That is, PAPR<$P_{threshold}$. Here, if the PAPR is reduced by virtue of the above-described TR algorithm or technique, the transmitter can increase the mean input power level $P_{\mu\_in}$ for the same information signal without causing the PAPR to exceed the threshold $P_{threshold}$.

As discussed above, in some examples, a transmitter and a receiver may exchange suitable signaling to coordinate the selection of a subset of tones within a transmitter's resource allocation to act as PRTs (e.g., a PRT sequence $\Phi$). In some other examples, a set or pattern of tone indexes in the PRT sequence $\Phi$ can be static or fixed, such that the receiver knows the PRT sequence $\Phi$ a priori, and the transmitter need not report the PRT sequence $\Phi$ to the receiver.

Some PRT sequences $\Phi$ can produce a time-domain kernel p that exhibits characteristics more suitable for PAPR reduction than other tone subsets. For example, an ideal PRT sequence Φ for use with the SCR-TR algorithm described above would provide for a time-domain kernel p having a waveform with a relatively sharp and narrow peak, and a negligible amplitude at all other times. With this ideal PRT sequence Φ, an iteration of the SCR-TR algorithm can precisely target for reduction a data waveform's peak, without affecting other portions of the data waveform. However, such an ideal PRT sequence Φ may not be achievable in implementation. For example, a narrowband resource allocation may lack a sufficient number of tones to provide such an ideal set of PRI's. Further, a PRT sequence Φ that includes a high number of tones can reduce a link's throughput by reducing the resources available to carry data-bearing symbols.

According to an aspect of the present disclosure, a base station or scheduling entity (e.g., gNB) may maintain a capability to flexibly change a PRT sequence Φ that a UE or scheduled entity utilizes for a given UL transmission. For example, a suitable reduction in PAPR relies in part on which tones the transmitter (e.g., UE) uses as PRTs. A base station may obtain a benefit from having the ability to select, modify, or change the UE's PRT sequence Φ based on one or more parameters or factors, such as the set of RBs allocated to the UE for an UL transmission (e.g., on PUSCH), based on the modulation and coding scheme (MCS) that the UE will employ for this UL transmission, or any other suitable factor or factors.

In a further aspect of this disclosure, a transmitter may have a capability to select from among two or more candidate PRT sequences Φ and/or two or more PRT sequence selection algorithms for a given transmission. For example, a transmitter and receiver may exchange suitable signaling to establish that both endpoints store in their respective memories a copy of an indexed table with a set of two or more candidate PRT sequences. By indexing these candidate PRT sequences in the respective tables, the transmitter and receiver can coordinate a selection of a PRT sequence from the table utilizing any suitable signaling of an index value. For example, a gNB may signal an index for a UE to use to select a correspondingly indexed PRT sequence. In this way, dynamic changes of the PRT sequence from among the previously coordinated set of candidate PRT sequences can be accomplished with substantially reduced signaling overhead compared to explicitly signaling a new PRT sequence when it changes.

In another example, a transmitter may have a capability to apply a deterministic, or agreed modification that modifies an initial PRT sequence. For example, a transmitter and receiver may exchange suitable signaling to establish that both endpoints store in memory a copy of an initial PRT sequence. Here, the transmitter and receiver can coordinate a selection of a PRT sequence utilizing any suitable signaling of a modification parameter, for modifying the initial PRT sequence. For example, a gNB may signal a shift parameter indicating a shift (e.g., a frequency shift) to be applied to the initial PRT sequence to obtain a modified PRT sequence for a given transmission or set of transmissions. In another example, a gNB may signal a down-sampling factor indicating a down-sampling to be applied to the initial PRT sequence to obtain a modified PRT sequence for a given transmission or set of transmissions. For example, see block 810, described below in connection with FIG. 8.

And in still another example, a transmitter and receiver can coordinate a selection of one of the above algorithms, or a combination of the above algorithms, by signaling a suitable algorithm selection parameter.

FIG. 8 is a flow chart illustrating an exemplary process 800 for tone reservation (TR) for PAPR reduction for a wireless transmission in accordance with some aspects of the present disclosure. As described below, some or all illustrated features may be omitted in a particular implementation within the scope of the present disclosure, and some illustrated features may not be required for implementation of all embodiments. In some examples, the process 800 may be carried out by the transmission/reception entity 400 illustrated in FIG. 4. In some examples, the process 800 may be carried out by any suitable apparatus or means for carrying out the functions or algorithm described below.

In some examples, FIG. 8 may correspond to block 708 from FIG. 7, for selecting a subset of tones as PRTs (e.g., selecting a PRT sequence).

At block 802, the apparatus may determine how many tones (e.g., M tones) to employ as PRTs. The selection of the value of M may be made based on any suitable parameters, or in other examples may be fixed or static. For example, the value of M may be a predetermined fraction of N; may depend on an amount of data ready to transmit on data-bearing tones; and/or may be signaled to the apparatus by the receiving entity, etc.

At optional block 804, if the apparatus is capable of selecting from among a plurality of PRT sequence selection algorithms, then the apparatus may select a PRT sequence selection algorithm from the available algorithms, e.g., based on one or more received PRT sequence selection parameters. For example, if at block 706 (see FIG. 7) the apparatus receives a PRT sequence selection algorithm parameter for selecting among those available PRT sequence selection algorithms (e.g., a PRT sequence selection algorithm index), the apparatus may base its selection of a PRT sequence selection algorithm to utilize based on the received parameter or index.

In an example that omits block 804, the apparatus may proceed from block 802 to one (e.g., a predetermined one) of the PRT sequence selection algorithms 806, 808, or 810 in various examples or implementations.

At block 806, the apparatus may determine tone indexes for a PRT sequence of M tones by selecting a PRT sequence from among a plurality of candidate PRT sequences based on a received sequence selection index. That is, as discussed above, in some examples, a set of received PRT sequence selection parameters may include a sequence selection index, indicating which PRT sequence to select from among stored candidate PRT sequences (e.g., stored in memory). In various examples, the apparatus may choose or select a given PRT sequence from among the available candidate sequences based on any suitable factors or parameters. For example, in some cases a resource allocation for a transmitter may be located in resources that are adjacent to, or near to, another channel or resource allocation in the frequency domain (e.g., for another device). In such a case, to reduce adjacent channel interference, it may be desirable for a buffer or gap to be provided between the data-bearing tones of the resource allocation, and the adjacent channel. Accordingly, if a candidate PRT sequence includes a set of one or more tones at an edge of a resource allocation, such as an edge proximate to or adjacent to the adjacent channel, the apparatus may select that candidate PRT sequence. In this manner, the tone or tones within the resource allocation that are closest (in frequency) to the adjacent channel may be occupied by PRTs, rather than data-bearing tones. In this way, adjacent channel interference can be reduced in combination with the PAPR reduction that may result from the use of the above-described systems, algorithms, methods, etc., for carrying out a tone reservation (TR) algorithm. And in a further aspect of the disclosure, it may occur that a resource allocation for a transmitter may be located in resources that are not necessarily adjacent to, or near to, another channel or resource allocation in the frequency domain. In such a case, where adjacent channel interference caused by the transmitter's transmission is less of a concern, the apparatus may select a candidate PRT sequence known to have a good or successful capability for reducing PAPR. For example, PRT sequences that follow pseudo-random patterns across a resource allocation, including but not limited to PRT sequences generated by employing a Golomb ruler, known to those of ordinary skill in the art, can provide good PAPR reduction performance.

At block 810, the apparatus may determine tone indexes for a PRT sequence of M tones by obtaining an initial PRT sequence from memory, and modifying the initial PRT sequence based on a received modification parameter. That is, as discussed above, in some examples, a set of received PRT sequence selection parameters may include a modification parameter, indicating how the apparatus is to modify the initial PRT sequence. For example, a modification parameter may indicate a frequency shift index for applying a frequency shift operation to the initial PRT sequence. Here, the shift index may correspond to a frequency shift of a given number of PRBs, a frequency shift of a given number of tones or subcarriers, or a shift of any other suitable unit or measure of frequency. For example, if a suitable reference point corresponding to a resource allocation lies at RB0, and an apparatus receives a shift index having a value of 3 RBs, the apparatus may apply a PRT sequence based on the initial PRT sequence, shifted by 3 RBs. In some examples, the apparatus may apply a circular or cyclic shift to the initial PRT sequence based on the shift index. And in some examples, such a shift may be employed to locate the PRT sequence at a selected location in frequency, e.g., based on a resource allocation for the corresponding transmission. That is, rather than providing a relative offset or shift as described above, in this example, a frequency shift index may include an absolute frequency location, an absolute tone index, an absolute RB index, an absolute RBG, BWP, sub-band, carrier, or band index/designator, etc. In some examples, such a shift may indicate a shift of the PRT sequence from one bandwidth part (BWP) to another, from one sub-band to another, from one carrier to another, from one band to another, etc.

In another example, a modification parameter may indicate a down-sampling factor value. This down-sampling factor value may indicate a down-sampling for an apparatus to apply to the initial PRT sequence. For example, if a signaled down-sampling factor indicates a value of 2, then the apparatus may apply a down-sampling of 2 to the initial PRT sequence, resulting in the modified PRT sequence having half the number of PRTs as the initial PRT sequence. For example, referring to FIG. 5, if the illustrated PRTs correspond to the initial PRT sequence, and a signaled down-sampling factor indicates a value of 2, then the apparatus may eliminate every other PRT from the initial PRT sequence, resulting in half the number of PRTs in the modified PRT sequence. That is:

$$\Phi_{initial} = \{0,4,5,7,9,10,11,14,15,18,20,21\}$$

Down-sampling factor=2

$$\Phi_{modified} = \{0,5,9,11,15,20\}$$

Of course, a down-sampling factor of 2 need not necessarily be implemented by eliminating every other PRT from the initial PRT sequence. In various examples, any suitable reduction in the number of PRTs corresponding to the down-sampling factor may be utilized.

By providing for dynamic down-sampling of the initial PRT sequence as described here, an apparatus may be enabled to dynamically control a transmission power based on coverage, path loss, or other channel parameters at that time. For example, in a coverage-limited scenario, an apparatus may reduce its PAPR, e.g., by applying a low down-sampling factor, such that the apparatus may transmit its signal at a higher power. For example, a down-sampling factor of 1 may be signaled, causing the apparatus to preserve all PRTs in the initial PRT sequence. However, as coverage improves (e.g., a path loss decreases), an apparatus may decrease the number of PRTs, since it may no longer need to transmit with such a high power as in the coverage-limited scenario. Thus, with a lower transmit power, reduction of the PAPR may be less critical an issue. In this way, by reducing the number of PRTs, those tones that are no longer PRTs may be re-allocated to act as data-bearing tones, increasing throughput.

At block 808, the apparatus may determine tone indexes for a PRT sequence of M tones by selecting a PRT sequence from among a plurality of candidate PRT sequences based on a received sequence selection index, e.g., as described above in connection with block 806. Further, the apparatus may modify the selected PRT sequence based on a received modification parameter, e.g., as described above in connection with block 810. That is, the apparatus may apply a combination of PRT sequence selection and PRT sequence modification as described herein, in some examples.

Upon completion of block 806, 808, or 810, the process 800 of FIG. 8 may end, with the apparatus having selected a PRT sequence. Thus, the process may return to block 710 in FIG. 7, as described above.

Figure 9:
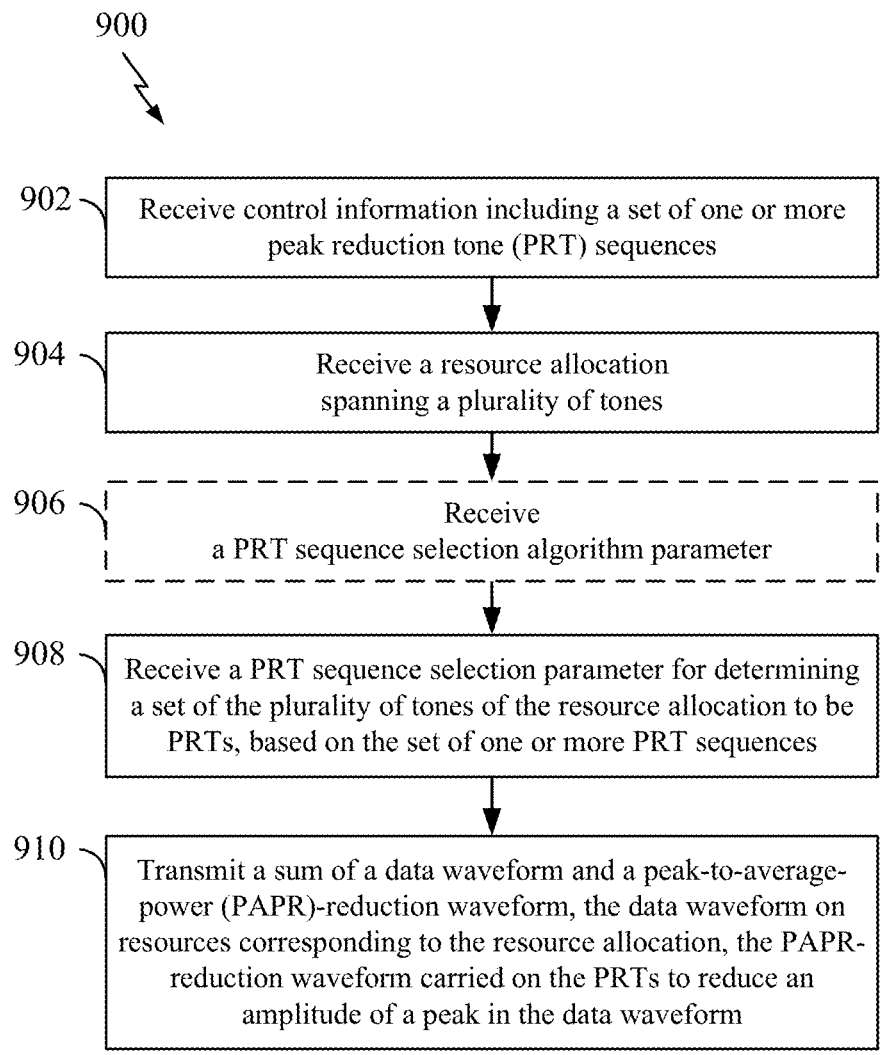
FIG. 9 is a flow chart illustrating an exemplary process at a transmitter for a PAPR reduction based on a TR algorithm according to some aspects of the disclosure.

FIG. 9 is a flow chart illustrating an exemplary process 900 at a transmitter for PAPR reduction for a wireless transmission in accordance with some aspects of the present disclosure. As described below, some or all illustrated features may be omitted in a particular implementation within the scope of the present disclosure, and some illustrated features may not be required for implementation of all embodiments. In some examples, the process 900 may be carried out by a transmitter, a UE, or a transmission/reception entity 400 illustrated in FIG. 4. In some examples, the process 900 may be carried out by any suitable apparatus or means for carrying out the functions or algorithm described below.

At block 902, a transmitter may receive control information. The control information may include a set of one or more PRT sequences. A receiver may transmit the control information via any suitable message or signal, including but not limited to a radio resource control (RRC) message, a MAC control element (MAC-CE) message, etc.

A PRT sequence may indicate which tones are PRTs among tones for granted and/or assigned resources. In some examples, a PRT sequence may include tone indexes that indicate locations of PRTs in N tones for granted and/or assigned resources. For example, N tones may have tone indexes with consecutive integers $\{0, \ldots, N-1\}$. Among N tones to be granted, a set of tones (M tones) may be PRTs, while the remaining tones (N-M tones) may be set as data-bearing tones. Thus, the set of tones (M tones) may be an M-element set of tone indexes, where M is less than N, and all elements of M tones are within N tones. If a transmitter receives a grant or an assignment for 1 RB or 12 tones having indexes $\{0, \ldots, 11\}$ and 4 tones are PRTs (e.g., 1st, 3rd, 7th, and 11th tones), a PRT sequence may have 4 indexes {0, 2, 6, 10} to indicate which tones are PRTs. In other examples, a receiver may configure a PRT sequence using a bitmask. The bitmask may include N bits corresponding to N tones, with each bit representing whether a corresponding tone is a PRT or a data-bearing tone. For example, a transmitter receives a grant or an assignment for 1 RB or 12 tones and 4 tones are PRTs (e.g., 1st, 3rd, 7th, and 11th tones). Then, a PRT sequence may be {1, 0, 1, 0, 0, 0, 1, 0, 0, 0, 1, 0} corresponding to the 12 tones, where '1' represents a PRT. It should be appreciated that a PRT sequence may indicate positions of PRTs in any other suitable form and any other suitable way. In some examples, a receiver may determine a PRT sequence for an OFDM symbol or multiple OFDM symbols. Thus, a PRT sequence may vary over time (e.g., per OFDM symbol, per slot, per subframe, per frame, or over any suitable time interval). Based on a PRT sequence, a transmitter may configure an amplitude and phase of a PAPR-reduction waveform on PRTs indicated in the PRT sequence to reduce or minimize the PAPR for a corresponding OFDM symbol.

In some aspects, a set of one or more PRT sequences may include multiple PRT sequences. That is, a transmitter (e.g., UE) may receive a set of any suitable number of multiple PRT sequences, and select a PRT sequence based on signaling (e.g., see block 908 below). In further aspects, in addition to selecting a PRT sequence, a transmitter may further modify the selected PRT sequence based on signaling (e.g., see block 908 below). Here, the different PRT sequences may have different numbers of PRT indexes, or may all have the same number of PRT indexes indicating which tones are PRTs.

In other aspects, a set of one or more PRT sequences may include an initial PRT sequence. That is, a transmitter (e.g., UE) may receive a suitable initial PRT sequence, and obtain a modified PRT sequence based on signaling (e.g., see block 908 below). Here, a suitable initial PRT sequence may be one generally known to provide for robust PAPR reduction performance in a TR algorithm.

At block 904, a transmitter may receive a resource allocation for data transmission. Here, the resource allocation may span any suitable number of tones, e.g., N tones. In some examples, the full set of N tones in a resource allocation may be denoted {0, . . . , N−1}. The full set of N tones in a resource allocation may include data-bearing tones. In some aspects, the transmitter may transmit an OFDM information message utilizing data-bearing tones. The full set of N tones may also include PRTs. As explained in block 902 above, a PRT sequence received from a receiver may indicate which tones are PRTs among the full set of N tones. In some examples, the sum of data-bearing tones and PRTs may be the full set of N tones in a resource allocation. That is, a transmitter may select some tones of granted resources as PRTs based on a PRT sequence, and the remaining tones of the granted resources that the transmitter does not select as PRTs may be available to carry data. The insertion of suitable PRTs among the data-bearing tones may reduce the PAPR of the transmission of the OFDM information message.

At optional block 906, if the transmitter is capable of selecting from among multiple PRT sequence selection algorithms, the transmitter may determine a set of granted tones to be PRTs based on a PRT sequence selection algorithm among the multiple PRT sequence selection algorithms. In some examples, the multiple PRT sequence selection algorithms may include an algorithm to select a PRT sequence among multiple PRT sequences, a PRT sequence modification algorithm, and a combination of both algorithms. In some examples, a transmitter may receive a PRT sequence selection algorithms parameter among multiple PRT sequence algorithms (e.g., a PRT sequence selection algorithm index). Then, the transmitter may select a PRT sequence selection algorithm (e.g., an algorithm to select a PRT sequence among multiple PRT sequences, and/or a PRT sequence modification algorithm) from the multiple PRT sequence selection algorithms based on the PRT sequence selection algorithm parameter or index.

In an example that omits block 906, the transmitter may proceed from block 904 to block 908 with a predetermined PRT sequence selection algorithm in various examples or implementations. If the transmitter receiver does receive a PRT sequence selection algorithm parameter, the transmitter may determine the PRT sequence selection algorithm based on a PRT sequence selection parameter (e.g., see block 908 below) or any other suitable message.

At block 908, a transmitter may receive a PRT sequence selection parameter for determining a set of the plurality of tones of the resource allocation to be PRTs, based on the set of one or more PRT sequences. In some examples, based on the PRT sequence selection parameter, the transmitter may also determine a PRT sequence selection algorithm among a plurality of PRT sequence selection algorithms (e.g., see block 906 above). In some examples, downlink control information (DCI) may carry the PRT sequence selection parameter on a physical downlink control channel (PDCCH). On the other hand, the transmitter may receive control information including a set of one or more PRT sequences on a different channel from the PDCCH. That is, the PRT sequence selection based on the PRT sequence selection parameter can lead to low latency, because a receiver may transmit such DCI on any given slot. However, the transmitter may receive a PRT sequence selection carried on any suitable channel and via any suitable format.

As explained in block 902, a set of one or more PRT sequences may include multiple PRT sequences or an initial PRT sequence. In some examples, based on a PRT sequence selection parameter, a transmitter may select a PRT sequence among the multiple PRT sequences or modify the initial PRT sequence for determining a set of multiple tones of a resource allocation to be PRTs. In other examples, based on a PRT sequence selection parameter, a transmitter may select a PRT sequence among the multiple PRT sequences and modify the selected PRT sequence for determining a set of multiple tones of a resource allocation to be PRTs.

In some examples, a set of one or more PRT sequences includes multiple PRT sequences. A PRT sequence selection parameter may include a PRT sequence selection index that indicates a selected PRT sequence from the multiple PRT sequences. The selected PRT sequence may indicate which tones among a resource assignment are PRTs. In some aspects, the selected PRT sequence may have good or the best capability for reducing PAPR among the multiple PRT sequences. For example, a transmitter may store multiple PRT sequences in memory, and may index the multiple PRT sequences in respective tables. A PRT sequence selection parameter may include a PRT sequence selection index that indicates a corresponding table of a selected PRT sequence of the multiple PRT sequences. Thus, rather than signaling a bitmask to explicitly indicate a PRT sequence selection, a PRT sequence selection signal, index, or address may indicate a selected PRT sequence among those in the multiple PRT sequences. In this way, dynamic changes or selections of the PRT sequence from among the previously coordinated multiple PRT sequences can be possible with substantially reduced signaling overhead compared to explicitly signaling a new PRT sequence.

In various examples, a transmitter may choose or select a given PRT sequence from among available multiple PRT sequences based on any suitable factors or parameters. For example, in some cases resources for a resource allocation a transmitter received may be adjacent to, or near to, another channel or resource allocation in the frequency domain (e.g., for another device). In such a case, to reduce adjacent channel interference, the transmitter may select a PRT sequence from among the multiple PRT sequences such that the PRT sequence indicates that the tone or tones within the resource allocation that are closest (in frequency) to the adjacent channel are PRTs, rather than data-bearing tones. In some examples, a PRT sequence selection parameter may include more than one PRT sequence selection index that indicates more than one selected PRT sequence from the multiple PRT sequences. Then, the transmitter may choose or select a PRT sequence from among more than one selected PRT sequence to reduce adjacent channel interference.

In other examples, a set of one or more PRT sequences may include an initial PRT sequence. A PRT sequence selection parameter may include a PRT sequence modification parameter for modifying the initial PRT sequence based on the PRT sequence modification parameter. The modified initial PRT sequence may indicate which tones among a resource assignment are PRTs.

In some aspects, a PRT sequence modification parameter may include a frequency shift index. A transmitter may apply a frequency shift to the initial PRT sequence by an amount corresponding to the frequency shift index. Here, the frequency shift index may correspond to a frequency shift of a given number of PRBs, a frequency shift of a given number of tones or subcarriers, or a shift of any other suitable unit or measure of frequency. In some examples, the transmitter may apply a circular or cyclic shift to the initial PRT sequence based on the shift index. And in some examples, a frequency shift index may include an absolute frequency location, an absolute tone index, an absolute RB index, an absolute RBG, BWP, sub-band, carrier, or band index/designator, etc. In some examples, such a shift may indicate a shift of the PRT sequence from one bandwidth part (BWP) to another, from one sub-band to another, from one carrier to another, from one band to another, etc.

In other aspects, a PRT sequence modification parameter may include a down-sampling factor value. A transmitter may apply a down-sampling to reduce a number of PRTs in the initial PRT sequence. In various examples, the transmitter may utilize any suitable reduction in the number of PRTs corresponding to the down-sampling factor. By providing for dynamic down-sampling of the initial PRT sequence, a transmitter may dynamically control a transmission power based on coverage, path loss, or other channel parameters at that time. For example, a transmitter may transmit its signal at a higher power by using a low down-sampling factor in a coverage-limited scenario. On the other hand, as coverage improves, a transmitter may increase throughput by using a high down-sampling factor to decrease the number of PRTs and reallocating the PRTs which are no longer PRTs as data-bearing tones.

In some examples, a set of one or more PRT sequences may include multiple PRT sequences. A PRT sequence selection parameter may include a PRT sequence selection index that indicates a selected PRT sequence from the multiple PRT sequences. The PRT sequence selection parameter may also include a PRT sequence modification parameter for modifying the selected PRT sequence based on the PRT sequence modification parameter. That is, the transmitter may apply a combination of PRT sequence selection and PRT sequence modification as described herein, in some examples.

At block 910, a transmitter may transmit a sum of a data waveform and a peak-to-average-power (PAPR)-reduction waveform. The data waveform may be carried on resources corresponding to the resource allocation. The PAPR-reduction waveform may be carried on the PRTs to reduce an amplitude of a peak in the data waveform.

In some examples, a transmitter may identify the largest peak |x(j)| in a time-domain data waveform x(t) corresponding to data-bearing tones of a resource assignment, and an associated time j when this peak occurs. The transmitter may determine a PAPR reduction waveform, corresponding to the selected PRTs, to reduce the amplitude of the identified peak. For example, as described above, the transmitter may determine a PAPR-reduction waveform carried on the PRTs according to the equation $$\frac{|x(j)| - \mu}{p(0)} p^j e^{i \angle x(j)},$$

where $\mu$ represents the target (post-reduction) power or amplitude of a modified time-domain data signal at time j; p(0) represents the peak amplitude of the time-domain kernel waveform p; $p^j$ represents a circular-shifted version (shifted by time t=j) of the time-domain kernel waveform; $\angle x(j)$ represents the phase of the time-domain data waveform x(t) at time t=j, or x(j); and $i=\sqrt{-1}$. The transmitter may determine a modified data waveform by subtracting the PAPR-reduction waveform from the data waveform. By summing or multiplexing the data waveform x(t) with the PAPR-reduction waveform $$\frac{|x(j)| - \mu}{p(0)} p^j e^{i \angle x(j)},$$

the composite transmission can have a reduced PAPR. Thus, the transmitter may transmit, with a reduced PAPR, the sum of a data waveform and a PAPR-reduction waveform or transmit a data waveform multiplexed with a PAPR-reduction waveform. Based on this, the transmitter can potentially increase the mean input power for the signal input to its power amplifier. That is, if the PAPR is reduced by virtue of the above-described TR algorithm or technique, the transmitter can increase the mean input power level $P_{\mu\_in}$ for the same information signal without causing the PAPR to exceed the threshold $P_{threshold}$.

Figure 10:
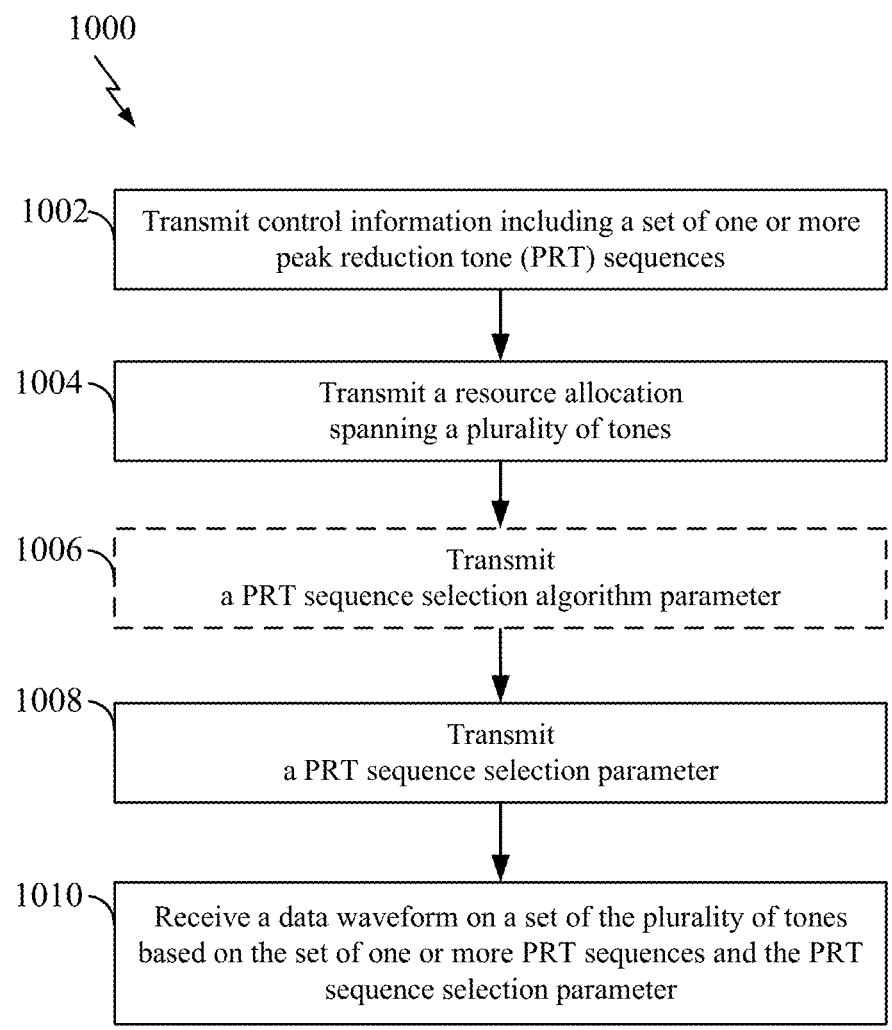
FIG. 10 is a flow chart illustrating an exemplary process at a receiver for a PAPR reduction based on a TR algorithm according to some aspects of the disclosure.

FIG. 10 is a flow chart illustrating an exemplary process 1000 at a receiver for PAPR reduction for a wireless transmission in accordance with some aspects of the present disclosure. As described below, some or all illustrated features may be omitted in a particular implementation within the scope of the present disclosure, and some illustrated features may not be required for implementation of all embodiments. In some examples, the process 1000 may be carried out by a receiver, a base station, or a transmission/reception entity 400 illustrated in FIG. 4. In some examples, the process 1000 may be carried out by any suitable apparatus or means for carrying out the functions or algorithm described below.

At block 1002, a receiver may transmit control information. The control information may include a set of one or more PRT sequences. A PRT sequence may indicate which tones are PRTs among tones for granted and/or assigned resources. In some examples, a PRT sequence may include tone indexes that indicate locations of PRTs in N tones for granted and/or assigned resources. In some aspects, a set of one or more PRT sequences may include multiple PRT sequences. In other aspects, a set of one or more PRT sequences may include an initial PRT sequence.

At block 1004, a receiver may transmit a resource allocation for data transmission. Here, the resource allocation may span any suitable number of tones, e.g., N tones. The full set of N tones in a resource allocation may include data-bearing tones and PRTs. As explained in block 1002 above, a PRT sequence may indicate which tones are PRTs among the full set of N tones. In some examples, a receiver may determine a PRT sequence selection algorithm from among multiple PRT sequence selection algorithms (e.g., an algorithm to select a PRT sequence among multiple PRT sequences, and/or a PRT sequence modification algorithm). In some examples, a receiver may determine a set of multiple tones to be data-bearing tones based on the determined PRT sequence selection algorithm. In other examples, a receiver may determine a set of multiple tones to be data-bearing tones based on a projected adjacent channel interference caused by the waveform. For example, in some cases resources for a resource allocation a receiver transmits may be adjacent to, or near to, another channel or resource allocation in the frequency domain (e.g., for another device). In such a case, to reduce adjacent channel interference, the receiver determine that the tone or tones within the resource allocation that are closest (in frequency) to the adjacent channel are not data-bearing tones.

At optional block 1006, a receiver may transmit a PRT sequence selection algorithm parameter for a transmitter to select a PRT sequence selection algorithm from among a plurality of PRT sequence selection algorithms. In an example that omits block 1006, the transmitter may proceed from block 1004 to block 1008 with a predetermined PRT sequence selection algorithm in various examples or implementations. Then, a receiver might not transmit a PRT sequence selection algorithm parameter. In that case, the transmitter may already have enough information to determine the PRT sequence selection algorithm based on a PRT sequence selection parameter (e.g., see block 1008 below) or any other suitable message.

At block 1008, a receiver may transmit a PRT sequence selection parameter. In some examples, a set of one or more PRT sequences includes multiple PRT sequences. A PRT sequence selection parameter may include a PRT sequence selection index that indicates a selected PRT sequence from the multiple PRT sequences. The selected PRT sequence may indicate which tones among a resource assignment are PRTs.

In other examples, a set of one or more PRT sequences may include an initial PRT sequence. A PRT sequence selection parameter may include a PRT sequence modification parameter for modifying the initial PRT sequence based on the PRT sequence modification parameter. The modified initial PRT sequence may indicate which tones among a resource assignment are PRTs.

In some aspects, a PRT sequence modification parameter may include a frequency shift index. A transmitter may apply a frequency shift to the initial PRT sequence by an amount corresponding to the frequency shift index. In other aspects, a PRT sequence modification parameter may include a down-sampling factor value. A transmitter may apply a down-sampling to reduce a number of PRTs in the initial PRT sequence. In various examples, the transmitter may utilize any suitable reduction in the number of PRTs corresponding to the down-sampling factor.

In some examples, a set of one or more PRT sequences may include multiple PRT sequences. A PRT sequence selection parameter may include a PRT sequence selection index that indicates a selected PRT sequence from the multiple PRT sequences. The PRT sequence selection parameter may also include a PRT sequence modification parameter for modifying the selected PRT sequence based on the PRT sequence modification parameter. That is, the transmitter may apply a combination of PRT sequence selection and PRT sequence modification as described herein, in some examples.

At block 1010, a receiver may receive a waveform on a set of multiple tones based on a set of one or more PRT sequences and a PRT sequence selection parameter. The data waveform may be a modified data waveform that multiplexes a data waveform with a peak-to-average-power (PAPR)-reduction waveform by a transmitter to reduce an amplitude of a peak in the data waveform.

FURTHER EXAMPLES HAVING A VARIETY OF FEATURES

Example 1

A method operable at a transmitter, apparatus, a transmitter, and non-transitory computer-readable medium for peak reduction tone sequence selection comprising: receiving control information comprising a set of one or more peak reduction tone (PRT) sequences; receiving a resource allocation spanning a plurality of tones; receiving a PRT sequence selection parameter for determining a set of the plurality of tones of the resource allocation to be PRTs, based on the set of one or more PRT sequences; and transmitting a sum of a data waveform and a peak-to-average-power (PAPR)-reduction waveform, the PAPR-reduction waveform carried on the PRTs to reduce an amplitude of a peak in the data waveform.

Example 2

The method, apparatus, a transmitter, and non-transitory computer-readable medium of Example 1, wherein the set of one or more PRT sequences comprises a plurality of PRT sequences, wherein the PRT sequence selection parameter comprises a PRT sequence selection index that indicates a selected PRT sequence from the plurality of PRT sequences, and wherein the set of the plurality of tones corresponds to the selected PRT sequence.

Example 3

The method, apparatus, a transmitter, and non-transitory computer-readable medium of any of Examples 1 to 2, wherein the set of one or more PRT sequences comprises an initial PRT sequence, wherein the PRT sequence selection parameter comprises a PRT sequence modification parameter for modifying the initial PRT sequence based on the PRT sequence modification parameter, and wherein the set of the plurality of tones corresponds to the modified initial PRT sequence.

Example 4

The method, apparatus, a transmitter, and non-transitory computer-readable medium of any of Examples 1 to 3, wherein the PRT sequence modification parameter comprises a frequency shift index, and wherein the modifying the initial PRT sequence comprises applying a frequency shift to the initial PRT sequence by an amount corresponding to the frequency shift index.

Example 5

The method, apparatus, a transmitter, and non-transitory computer-readable medium of any of Examples 1 to 4, wherein the PRT sequence modification parameter comprises a down-sampling factor value, and wherein the modifying the initial PRT sequence comprises applying a down-sampling to reduce a number of PRTs in the initial PRT sequence based on the down-sampling factor value.

Example 6

The method, apparatus, a transmitter, and non-transitory computer-readable medium of any of Examples 1 to 5, further comprising: determining the set of the plurality of tones to be PRTs further based on a Pia sequence selection algorithm among a plurality of PRT sequence selection algorithms.

Example 7

The method, apparatus, a transmitter, and non-transitory computer-readable medium of any of Examples 1 to 6, further comprising: receiving a PRI sequence selection algorithm parameter: and selecting the PRT sequence selection algorithm from the plurality of PRT sequence selection algorithms based on the PRT sequence selection algorithm parameter.

Example 8

The method, apparatus, a transmitter, and non-transitory computer-readable medium of any of Examples 1 to 7, wherein the receiving the PRT sequence selection parameter comprises receiving downlink control information (DCI) carrying the PRT sequence selection parameter on a physical downlink control channel (PDCCH), and wherein the receiving the control information is on a second channel other than the PDCCH.

Example 9

A method operable at a receiver, apparatus, a receiver, and non-transitory computer-readable medium for wireless communication, comprising: transmitting control information comprising a set of one or more peak reduction tone (PRT) sequences; transmitting a resource allocation spanning a plurality of tones; transmitting a PRT sequence selection parameter; and receiving a waveform on a set of the plurality of tones based on the set of one or more PRT sequences and the PRT sequence selection parameter.

Example 10

The method, apparatus, a receiver, and non-transitory computer-readable medium of Example 9, wherein the set of one or more PRT sequences comprises a plurality of PRT sequences, and wherein the PRT sequence selection parameter comprises a PRT sequence selection index that indicates a selected PRT sequence from the plurality of PRT sequences.

Example 11

The method, apparatus, a receiver, and non-transitory computer-readable medium of any of Examples 9 to 10, further comprising determining the set of the plurality of tones for the data waveform based on a projected adjacent channel interference caused by the data waveform.

Example 12

The method, apparatus, a receiver, and non-transitory computer-readable medium of any of Examples 9 to 11, wherein the set of one or more PRT sequences comprises an initial PRT sequence, and wherein the PRT sequence selection parameter comprises a PRT sequence modification parameter.

Example 13

The method, apparatus, a receiver, and non-transitory computer-readable medium of any of Examples 9 to 12, wherein the PRT sequence modification parameter comprises a frequency shift index for indicating a frequency shift for a transmitter to apply to the initial PRT sequence.

Example 14

The method, apparatus, a receiver, and non-transitory computer-readable medium of any of Examples 9 to 13, wherein the PRT sequence modification parameter comprises a down-sampling factor value for indicating a down-sampling to reduce a number of PRTs in the initial PRT sequence.

Example 15

The method, apparatus, a receiver, and non-transitory computer-readable medium of any of Examples 9 to 14, further comprising: determining a PRT sequence selection algorithm from among a plurality of PRT sequence selection algorithms; determining the set of the plurality of tones to be data-bearing tones based on the determined PRT sequence selection algorithm; and transmitting a PRT sequence selection algorithm parameter based on the determine PRT sequence selection algorithm.

Example 16

A transmitter for wireless communication, comprising: means for receiving control information comprising a set of one or more peak reduction tone (PRT) sequences; means for receiving a resource allocation spanning a plurality of tones; means for receiving a PRT sequence selection parameter for determining a set of the plurality of tones of the resource allocation to be PRTs, based on the set of one or more PRT sequences; and means for transmitting a sum of a data waveform and a peak-to-average-power (PAPR)-reduction waveform, the PAPR-reduction waveform carried on the PRTs to reduce an amplitude of a peak in the data waveform.

Example 17

The transmitter of Example 16, wherein the set of one or more PRT sequences comprises a plurality of PRT sequences, wherein the PRT sequence selection parameter comprises a PRT sequence selection index that indicates a selected PRT sequence from the plurality of PRT sequences, and wherein the set of the plurality of tones corresponds to the selected PRT sequence.

Example 18

The transmitter of any of Examples 16 to 17, wherein the set of one or more PRT sequences comprises an initial PRT sequence, wherein the PRT sequence selection parameter comprises a PRT sequence modification parameter for modifying the initial PRT sequence based on the PRT sequence modification parameter, and wherein the set of the plurality of tones corresponds to the modified initial PRT sequence.

Example 19

The transmitter of any of Examples 16 to 18, wherein the PRT sequence modification parameter comprises a frequency shift index, and wherein the modifying the initial PRT sequence comprises applying a frequency shift to the initial PRT sequence by an amount corresponding to the frequency shift index.

Example 20

The transmitter of any of Examples 16 to 19, wherein the PRT sequence modification parameter comprises a down-sampling factor value, and wherein the modifying the initial PRT sequence comprises applying a down-sampling to reduce a number of PRTs in the initial PRT sequence based on the down-sampling factor value.

Example 21

The transmitter of any of Examples 16 to 20, further comprising: means for determining the set of the plurality of tones to be PRTs further based on a PRT sequence selection algorithm among a plurality of PRT sequence selection algorithms.

Example 22

The transmitter of any of Examples 16 to 21, further comprising: means for receiving a PRT sequence selection algorithm parameter; and means for selecting the PRT sequence selection algorithm from the plurality of PRT sequence selection algorithms based on the PRT sequence selection algorithm parameter.

Example 23

The transmitter of any of Examples 16 to 22, wherein the receiving the PRT sequence selection parameter comprises receiving downlink control information (DCI) carrying the PRT sequence selection parameter on a physical downlink control channel (PDCCH), and wherein the receiving the control information is on a second channel other than the PDCCH.

Example 24

A receiver for wireless communication, comprising: means for transmitting control information comprising a set of one or more peak reduction tone (PRT) sequences; means for transmitting a resource allocation spanning a plurality of tones; transmitting a PRT sequence selection parameter; and means for receiving a waveform on a set of the plurality of tones based on the set of one or more PRT sequences and the PRT sequence selection parameter.

Example 25

The receiver of Example 24, wherein the set of one or more PRT sequences comprises a plurality of PRT sequences, and wherein the PRT sequence selection parameter comprises a PRT sequence selection index that indicates a selected PRT sequence from the plurality of PRT sequences.

Example 26

The receiver of any of Examples 24 to 25, further comprising determining the set of the plurality of tones for the data waveform based on a projected adjacent channel interference caused by the data waveform.

Example 27

The receiver of any of Examples 24 to 26, wherein the set of one or more PRT sequences comprises an initial PRT sequence, and wherein the PRT sequence selection parameter comprises a PRT sequence modification parameter.

Example 28

The receiver of any of Examples 24 to 27, wherein the PRT sequence modification parameter comprises a frequency shift index for indicating a frequency shift for a transmitter to apply to the initial PRT sequence.

Example 29

The receiver of any of Examples 24 to 28, wherein the PRT sequence modification parameter comprises a down-sampling factor value for indicating a down-sampling to reduce a number of PRTs in the initial PRT sequence.

Example 30

The receiver of any of Examples 24 to 29, further comprising: means for determining a PRT sequence selection algorithm from among a plurality of PRT sequence selection algorithms; means for determining the set of the plurality of tones to be data-bearing tones based on the determined PRT sequence selection algorithm; and means for transmitting a PRT sequence selection algorithm parameter based on the determine PRT sequence selection algorithm.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-8 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-8 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. An apparatus for wireless communication, comprising:
   a processor;
   a transceiver communicatively coupled to the processor; and
   a memory communicatively coupled to the processor,
   wherein the processor and the memory are configured to:
      receive, via the transceiver, control information comprising a set of one or more peak reduction tone (PRT) sequences;
      receive, via the transceiver, a resource allocation spanning a plurality of tones;
      receive, via the transceiver, a PRT sequence selection parameter for determining a set of the plurality of tones of the resource allocation to be PRTs, based on the set of one or more PRT sequences; and
      transmit, via the transceiver, a sum of a data waveform and a peak-to-average-power (PAPR)-reduction waveform, the PAPR-reduction waveform carried on the PRTs to reduce an amplitude of a peak in the data waveform.

2. The apparatus of claim 1, wherein the set of one or more PRT sequences comprises a plurality of PRT sequences,
   wherein the PRT sequence selection parameter comprises a PRT sequence selection index that indicates a selected PRT sequence from the plurality of PRT sequences, and
   wherein the set of the plurality of tones corresponds to the selected PRT sequence.

3. The apparatus of claim 1, wherein the set of one or more PRT sequences comprises an initial PRT sequence,
   wherein the PRT sequence selection parameter comprises a PRT sequence modification parameter for modifying the initial PRT sequence based on the PRT sequence modification parameter, and
   wherein the set of the plurality of tones corresponds to the modified initial PRT sequence.

4. The apparatus of claim 3, wherein the PRT sequence modification parameter comprises a frequency shift index, and
   wherein the modifying the initial PRT sequence comprises applying a frequency shift to the initial PRT sequence by an amount corresponding to the frequency shift index.

5. The apparatus of claim 3, wherein the PRT sequence modification parameter comprises a down-sampling factor value, and
   wherein the modifying the initial PRT sequence comprises applying a down-sampling to reduce a number of PRTs in the initial PRT sequence based on the down-sampling factor value.

6. The apparatus of claim 1, wherein the processor and the memory are further configured to:
   determine the set of the plurality of tones to be PRTs further based on a PRT sequence selection algorithm among a plurality of PRT sequence selection algorithms.

7. The apparatus of claim 6, wherein the processor and the memory are further configured to:
receive a PRT sequence selection algorithm parameter; and
select the PRT sequence selection algorithm from the plurality of PRT sequence selection algorithms based on the PRT sequence selection algorithm parameter.

8. The apparatus of claim 1, wherein the receiving the PRT sequence selection parameter comprises receiving downlink control information (DCI) carrying the PRT sequence selection parameter on a physical downlink control channel (PDCCH), and
wherein the receiving the control information is on a second channel other than the PDCCH.

9. A method of wireless communication operable at a transmitter, comprising:
receiving control information comprising a set of one or more peak reduction tone (PRT) sequences;
receiving a resource allocation spanning a plurality of tones;
receiving a PRT sequence selection parameter for determining a set of the plurality of tones of the resource allocation to be PRTs, based on the set of one or more PRT sequences; and
transmitting a sum of a data waveform and a peak-to-average-power (PAPR)-reduction waveform, the data waveform on resources corresponding to the resource allocation, the PAPR-reduction waveform carried on the PRTs to reduce an amplitude of a peak in the data waveform.

10. The method of claim 9, wherein the set of one or more PRT sequences comprises a plurality of PRT sequences,
wherein the PRT sequence selection parameter comprises a PRT sequence selection index that indicates a selected PRT sequence from the plurality of PRT sequences, and
wherein the set of the plurality of tones corresponds to the selected PRT sequence.

11. The method of claim 9, wherein the set of one or more PRT sequences comprises an initial PRT sequence,
wherein the PRT sequence selection parameter comprises a PRT sequence modification parameter for modifying the initial PRT sequence based on the PRT sequence modification parameter, and
wherein the set of the plurality of tones corresponds to the modified initial PRT sequence.

12. The method of claim 11, wherein the PRT sequence modification parameter comprises a frequency shift index, and
wherein the modifying the initial PRT sequence comprises applying a frequency shift to the initial PRT sequence by an amount corresponding to the frequency shift index.

13. The method of claim 11, wherein the PRT sequence modification parameter comprises a down-sampling factor value, and
wherein the modifying the initial PRT sequence comprises applying a down-sampling to reduce a number of PRTs in the initial PRT sequence based on the down-sampling factor value.

14. The method of claim 13, further comprising:
determining the set of the plurality of tones to be PRTs further based on a PRT sequence selection algorithm among a plurality of PRT sequence selection algorithms.

15. The method of claim 14, further comprising:
receiving a PRT sequence selection algorithm parameter; and
selecting the PRT sequence selection algorithm from the plurality of PRT sequence selection algorithms based on the PRT sequence selection algorithm parameter.

16. The method of claim 9, wherein the receiving the PRT sequence selection parameter comprises receiving downlink control information (DCI) carrying the PRT sequence selection parameter on a physical downlink control channel (PDCCH), and
wherein the receiving the control information is on a second channel other than the PDCCH.

* * * * *